(12) United States Patent
Handelman

(10) Patent No.: US 7,536,067 B2
(45) Date of Patent: May 19, 2009

(54) PHOTONIC INTEGRATED CIRCUIT DEVICE AND ELEMENTS THEREOF

(76) Inventor: Doron Handelman, 14 Hama'avak Street, Givatayim (IL) 53520

( * ) Notice: Subject to any disclaimer, the term of this patent is extended or adjusted under 35 U.S.C. 154(b) by 0 days.

(21) Appl. No.: 11/833,306

(22) Filed: Aug. 3, 2007

(65) Prior Publication Data

US 2008/0037928 A1  Feb. 14, 2008

Related U.S. Application Data

(63) Continuation of application No. 11/035,732, filed on Jan. 18, 2005.

(51) Int. Cl.
*G02B 6/26* (2006.01)

(52) U.S. Cl. .......................................... 385/16

(58) Field of Classification Search ........................ None
See application file for complete search history.

(56) References Cited

U.S. PATENT DOCUMENTS

| | | |
|---|---|---|
| 4,626,075 A | 12/1986 | Chemla |
| 4,726,010 A | 2/1988 | Ali et al. |
| 5,170,273 A | 12/1992 | Nishio |
| 5,191,457 A | 3/1993 | Yamazaki |
| 5,194,977 A | 3/1993 | Nishio |
| 5,319,484 A | 6/1994 | Jacob et al. |
| 5,325,222 A | 6/1994 | Jacob et al. |
| 5,402,256 A | 3/1995 | Spanke |
| 5,414,548 A | 5/1995 | Tachikawa et al. |
| 5,416,625 A | 5/1995 | Cavaciuti et al. |
| 5,430,454 A | 7/1995 | Refregier et al. |
| 5,430,726 A | 7/1995 | Moorwood et al. |
| 5,452,115 A | 9/1995 | Tomioka |
| 5,457,687 A | 10/1995 | Newman |
| 5,542,010 A | 7/1996 | Glance et al. |
| 5,557,439 A | 9/1996 | Alexander et al. |
| 5,680,490 A | 10/1997 | Cohen et al. |
| 5,712,932 A | 1/1998 | Alexander et al. |
| 5,724,167 A | 3/1998 | Sabella |
| 5,739,935 A | 4/1998 | Sabella |
| 5,774,244 A | 6/1998 | Tandon et al. |
| 5,867,289 A | 2/1999 | Gerstel et al. |
| 5,953,138 A | 9/1999 | Ellis |
| 5,959,752 A | 9/1999 | Ota |
| 6,023,360 A | 2/2000 | Morioka et al. |
| 6,061,484 A | 5/2000 | Jones et al. |
| 6,108,112 A | 8/2000 | Touma |
| 6,111,673 A * | 8/2000 | Chang et al. .................. 398/79 |
| 6,204,944 B1 | 3/2001 | Uchiyama et al. |
| 6,233,082 B1 | 5/2001 | Johnson |
| 6,288,808 B1 | 9/2001 | Lee et al. |

(Continued)

OTHER PUBLICATIONS

Office Action mailed Apr. 14, 2008 for U.S. Appl. No. 11/833,277 of Handelman, filed Aug. 3, 2007.

(Continued)

*Primary Examiner*—Sung H Pak
*Assistant Examiner*—Hoang Tran

(57) ABSTRACT

A photonic integrated circuit (PIC) device is described. The PIC device includes a set of optical transceivers including optical transmitters and optical receivers, and an embedded optical interconnect mesh operatively associated with the set of optical transceivers and structured to enable at least one of the following network architectures: a star network architecture, a bus/broadcast network architecture, and a ring network architecture. Related apparatus and methods are also described.

10 Claims, 9 Drawing Sheets

U.S. PATENT DOCUMENTS

| | | | |
|---|---|---|---|
| 6,314,115 B1 | 11/2001 | Delfyett et al. | |
| 6,351,323 B1 | 2/2002 | Onaka et al. | |
| 6,374,020 B1 | 4/2002 | Paniccia | |
| 6,374,087 B1 | 4/2002 | Gressent et al. | |
| 6,393,169 B1 | 5/2002 | Paniccia et al. | |
| 6,404,522 B1 * | 6/2002 | Handelman | 398/79 |
| 6,509,992 B1 | 1/2003 | Goodwill | |
| 6,574,018 B1 | 6/2003 | Handelman | |
| 6,609,840 B2 | 8/2003 | Chow et al. | |
| 6,631,246 B2 | 10/2003 | Ford et al. | |
| 6,690,851 B1 * | 2/2004 | Guilfoyle | 385/18 |
| 6,718,080 B2 | 4/2004 | Ofek et al. | |
| 6,738,581 B2 | 5/2004 | Handelman | |
| 6,744,762 B1 | 6/2004 | Hojo | |
| 6,763,191 B1 | 7/2004 | Handelman | |
| 6,775,316 B2 | 8/2004 | Vakhshoori et al. | |
| 6,775,480 B1 | 8/2004 | Goodwill | |
| 6,778,739 B1 | 8/2004 | Jerphagnon et al. | |
| 6,822,979 B2 | 11/2004 | Daiber | |
| 6,889,010 B2 | 5/2005 | Trezza | |
| 6,944,399 B2 | 9/2005 | Yu et al. | |
| 6,956,868 B2 * | 10/2005 | Qiao | 370/466 |
| 6,990,350 B2 | 1/2006 | Davis et al. | |
| 7,046,928 B1 | 5/2006 | Bradford et al. | |
| 7,050,663 B2 | 5/2006 | Nikonov et al. | |
| 7,054,558 B2 | 5/2006 | De Girolamo et al. | |
| 7,099,578 B1 | 8/2006 | Gerstel | |
| 7,123,786 B2 | 10/2006 | Welch et al. | |
| 7,167,443 B1 | 1/2007 | Dantu et al. | |
| 7,167,620 B2 | 1/2007 | Handelman | |
| 7,188,280 B2 | 3/2007 | Shinomiya et al. | |
| 7,203,392 B2 | 4/2007 | Tsuyama | |
| 7,272,323 B2 | 9/2007 | Grann et al. | |
| 7,298,974 B2 | 11/2007 | Tanobe et al. | |
| 7,376,348 B2 | 5/2008 | Hasuo et al. | |
| 7,398,018 B2 | 7/2008 | Ohara | |
| 2002/0048067 A1 | 4/2002 | Handelman et al. | |
| 2002/0109876 A1 | 8/2002 | Eijk et al. | |
| 2002/0181503 A1 | 12/2002 | Montgomery, Jr. | |
| 2003/0043430 A1 | 3/2003 | Handelman | |
| 2003/0048506 A1 | 3/2003 | Handelman | |
| 2003/0076865 A1 | 4/2003 | Chang-Hasnain et al. | |
| 2003/0099018 A1 | 5/2003 | Singh et al. | |
| 2004/0067006 A1 | 4/2004 | Welch et al. | |
| 2004/0184714 A1 | 9/2004 | Graves et al. | |
| 2004/0208418 A1 | 10/2004 | Handelman | |
| 2004/0210738 A1 | 10/2004 | Kato et al. | |
| 2005/0013568 A1 | 1/2005 | Handelman | |
| 2006/0159387 A1 | 7/2006 | Handelman | |
| 2007/0269160 A1 | 11/2007 | Handelman | |
| 2007/0269214 A1 | 11/2007 | Handelman | |
| 2007/0269220 A1 | 11/2007 | Handelman | |
| 2007/0269221 A1 | 11/2007 | Handelman | |

OTHER PUBLICATIONS

Linking with Light, Neil Savage, IEEE Spectrum, Aug. 2002, pp. 32-36.
Self-Organized Lightwave Network Based on Waveguide Films for Three-Dimensional Optical Wiring Within Boxes, Yoshimura, et al., Journal of Lightwave Technology, vol. 22, No. 9, Sep. 2004, pp. 2091-2099.
Board-Level Otical Interconnection and Signal Distribution Using Embedded Thin-Film Optoelectronic Devices, Cho, et al., Journal of Lightwave Technology, vol. 22, No. 9, Sep. 2004, pp. 2111-2118.
Optical Backplane System Using Waveguide-Embedded PCBs and Optical Slots, Yoon, et al., Journal of Lightwave Technology, vol. 22, No. 9, Sep. 2004, pp. 2119-2127.
PCB-Compatible Optical Interconnection Using 45 0-Ended Connection Rods and Via-Holed Waveguides, Rho, et al., Journal of Lightwave Technology, vol. 22, No. 9, Sep. 2004, pp. 2128-2134.
Board-to-Board Optical Interconnection System Using Optical Slots, Cho, et al., IEEE Photonics Technology Letters, vol. 16, No. 7, Jul. 2004, pp. 1754-1756.
Tunable Laser Implementation Agreement, Implementation Agreement OIF-TL-01.1, Selvik, et al., the Physical and Link Layer (PLL) Working Group of the Optical Internetworking Forum (OIF), Nov. 27, 2002, at the web site www.oiforum.com/public/impagreements.html.
Multi-Source Agreement for CW Tunable Lasers, Implentation Agreement OIF-TLMSA-01.0, Jeff Hutchins, et al., the Physical and Link Layer (PLL) Working Group of the Optical Internetworking Forum (OIF), May 30, 2003, at the web site www.oiforum.com/public/impagreements.html.
Integratable Tunable Laser Assembly Multi Source Agreement, Implementation Agreement OIF-ITLA-MSA-01.0, Jeff Hutchins, et al., Optical Internetworking Forum (OIF), Jun. 15, 2004 at the web site www.oiforum.com/public/impagreements.html.
OIF Tunable Laser Projects, Jeff Hutchins, OIF document, at the web site www.oiforum.com/public/whitepapers.html.
Standardizing Tunable Lasers, Jeff Hutchins, Photonics Spectra, Jun. 2004, pp. 88-92.
Surface-Emitting Laser—Its Birth and Generation of New Optoelectronics Field, Kenichi Iga, IEEE Journal on Selected Topics in Quantum Electronics, vol. 6, No. 6, Nov./Dec. 2000, pp. 1201-1215.
Packet switching takes step toward optical, Jeff Hecht, Laser Focus World, Jun. 2002, pp. 131-139.
Optical Signal Processing for Optical Packet Switching Networks, Blumenthal, et al., IEEE Optical Communications, Feb. 2003, pp. S23-S29.
Restoration schemes for agile photonic networks, Peter Roorda, et al., Lightwave Europe, Aug. 2003, pp. 10-12.
Photonic Crystals Show Promise for Wiring Optical Chips, Dr. Dominic F.G. Gallagher, EuroPhotonics, Feb./Mar. 2004, pp. 20-21.
A Novel Polarization Splitter Based on the Photonic Crystal Fiber With Nonidentical Dual Cores, Zhang, et al., IEEE Photonics Technology Letters, vol. 16, No. 7, Jul. 2004, pp. 1670-1672.
Photonic Crystals: A Growth Industry, Daniel C. McCarthy, Photonics Spectra, Jun. 2002, pp. 54-60.
IETF Work on Protection and Restoration for Optical Networks, David W. Griffith, Optical Networks Magazine, Jul./Aug. 2003, pp. 101-106.
All-Optical Switching Technologies for Protection Applications, Appelman, et al., IEEE Optical Communications, Nov. 2004, pp. S35-S40.
Fundamentals of Networking Technology, M. H. Coden, The Fiber Optic LAN Handbook, Fifth Edition, Codenoll® Technology Corporation, 1993, pp. 57-72.
Optical Transmitters, Price, et al., The Communications Handbook, 1997, CRC Press & IEEE Press, pp. 774-788.
Mining the optical bandwidth for a terabit per second, Alan Eli Willner, IEEE Spectrum, Apr. 1997, pp. 32-41.
Passive Optical Components, Joseph C. Palais, The Communications Handbook, 1997, CRC Press & IEEE Press, pp. 824-831.
Multiple wavelenghs exploit fiber capacity, Eric J. Lerner, Laser Focus World, Jul. 1997, pp. 119-125.
Advances in dense WDM push diode-laser design, Diana Zankowsky, Laser Focus World, Aug. 1997, pp. 167-171.
Fiber Optic Applications, Chung-Sheng Li, The Communications Handbook, 1997, CRC Press & IEEE Press, pp. 872-882.
Optical switching promises cure for telecommunications logjam, Jeff Hecht, Laser Focus World, Sep. 1998, pp. 69-72.
Optical Switches Ease Bandwidth Crunch, EuroPhotonics, Rien Flipse, Aug./Sep. 1998, pp. 44-45.
Wavelength Lockers Keep Lasers in Line, Ed Miskovic, Photonics Spectra, Feb. 1999, pp. 104-110.
Optical switches pursue crossconnect markets, Hassaun Jones-Bey, Laser Focus World, May 1998, pp. 153-162.
Multiple Access Methods for Communications Networks, Izhak Rubin, The Communications Handbook, 1997, CRC Press & IEEE Press, pp. 622-649.
Multigigabit Networks: The Challenge, Claude Rolland, et al., IEEE LTS, May 1992, pp. 16-26.

Direct Detection Lightwave Systems: Why Pay More? Paul Green, et al., IEEE LCS, Nov. 1990, pp. 36-49.

Photonics in Switching, Scott Hinton, IEEE LTS, Aug. 1992, pp. 26-35.

Advanced Technololgy for Fiber Optic Subscriber Systems, Hiromu Toba, et al., IEEE LTS, Nov. 1992, pp. 12-18.

Technologies for Local-Access Fibering, Yukou Mochida, IEEE Communications Magazine, Feb. 1994, pp. 64-73.

Wavelength Assignment in Multihop Lightwave Networks, Aura Ganz, et al., IEEE Transactions on Communications, vol. 42, No. 7, Jul. 1994, pp. 2460-2469.

Wavelength-Division Switching Technology in Photonic Switching Systems, Suzuki, et al., IEEE International Conference on Communications, ICC 1990, pp. 1125-1129.

Branch-Exchange Sequences for Reconfiguration of Lightwave Networks, Labourdette, et al., IEEE Transactions on Communications, vol. 42, No. 10, Oct. 1994, pp. 2822-2832.

Use of Delegated Tuning and Forwarding in Wavelength Divison Multiple Acess Networks, Auerbach, et al., IEEE Transactions on Communications, vol. 43, No. 1, Jan. 1995, pp. 52-63.

Combining gratings and filters reduces WDM channel spacing, Pan and Shi, Optoelectonics World, Sep. 1998, pp. S11-S17.

Design and Cost Performance of the Multistage WDM-PON Access Networks, Guido Maier, et al., Journal of Lightwave Technology, vol. 18, No. 2, Feb. 2000, pp. 125-143.

Photons at Work: Optical Networks on The Rise, Lee Goldberg, Electronic Design, Mar. 22, 1999, pp. 56-66.

Variable optical delay line with diffraction-limited autoalignment, Klovekorn and Munch, Applied Optics, Apr. 1, 1998, vol. 37, No. 10, pp. 1903-1904.

Fiber-Optic Chips Multiplex 16 T1/E1 Channels Over One Cable, Denise Culhane, Electronic Design, Apr. 17, 2000, p. 46.

Analysis and Dimensioning of Switchless Networks for Single-Layer Optical Architecture, Binetti, et al., Journal of Lightwave Technology, vol. 18, No. 2, Feb. 2000, pp. 144-153.

Time-Stretch Methods Capture Fast Waveforms, Jalali, et al., Microwaves & RF, Apr. 1999, pp. 62-69.

Building Future Networks by Using Photonics in Switching, Hinterlong, et al., The Communications Handbook, 1997, CRC Press & IEEE Press, pp. 513-528.

Architectural and Technological Issues for Future Optical Internet Networks, Listanti, et al., IEEE Communications Magazine, Sep. 2000, pp. 82-92.

IP over Optical Networks: Architectural Aspects, Rajagopalan, et al., IEEE Communications Magazine, Sep. 2000, pp. 94-102.

Labeled Optical Burst Switching for IP-over-WDM Integration, Chunming Qiao, IEEE Communications Magazine, Sep. 2000, pp. 104-114.

Approaches to Optical Internet Packet Switching, Hunter, et al., IEEE Communications Magazine, Sep. 2000, pp. 116-122.

Photonic Switches: Fast, but Functional?, McCarthy, Photonics Spectra, Mar. 2001, pp. 140-150.

WDM Local Area Networks, Kazovsky, et al., IEEE LTS, May 1992, pp. 8-15.

A Simple Dynamic Integrated Provisioning/Protection Scheme in IP Over WDM Networks, Yinghua Ye, et al., IEEE Communications Magazine, Nov. 2001, pp. 174-182.

Photonic packet switching and optical label swapping, Daniel J. Blumenthal, Optical Networks Magazine, Nov./Dec. 2001, pp. 54-65.

Intelligent Optical Networking for Multilayer Survivability, Sophie De Maesschalck, et al., IEEE Communications Magazine, Jan. 2002, pp. 42-49.

Wavelength-Division Multiplexed Systems and Applications, Mari W. Maeda, The Communications Handbook, 1997, CRC Press & IEEE Press, pp. 883-890.

All-optical converters promise improved networks, Jeff Hecht, Laser Focus World, Apr. 2001, pp. 159-164.

All-optical switching for high bandwidth optical networks, M. J. Potasek, Optical Networks Magazine, Nov./Dec. 2002, pp. 30-43.

Demultiplexing of 168-Gb/s Data Pulses with a Hybrid-Integrated Symmetric Mach-Zehnder All-Optical Switch, Nakamura, et al., IEEE Photonics Technology Letters, vol. 12, No. 4, Apr. 2000, pp. 425-427.

Wavelength Switching Components for Future Photonic Networks, White, et al., IEEE Communications Magazine, Sep. 2002, pp. 74-81.

Architecture of Ultrafast Optical Packet Switching Ring Network, Takada, et al., Journal of Lightwave Technology, vol. 20, No. 12, Dec. 2002, pp. 2306-2315.

Monolithically Integrated 2×2 InGaAsP/InP Laser Amplifier Gate Switch Arrays, Janson, et al., Electronics Letters, vol. 28, No. 8, Apr. 9, 1992, pp. 776-778.

Monolithically Integrated 4×4 InGaAsP/InP Laser Amplifier Gate Switch Arrays, Gustavsson, et al., Electronics Letters, vol. 28, No. 24, Nov. 19, 1992, pp. 2223-2225.

All-Optical Triode Based on a Tandem Wavelength Converter Using Reflective Semiconductor Optical Amplifiers, Maeda, et al., IEEE Photonics Technology Letters, vol. 15, No. 2, Feb. 2003, pp. 257-259.

160-Gb/s Optical-Time-Division Multiplexing With PPLN Hybrid Integrated Planar Lightwave Circuit, Ohara, et al., IEEE Photonics Technology Letters, vol. 15, No. 2, Feb. 2003, pp. 302-304.

Semiconductor Arrayed Waveguide Gratings for Photonic Integrated Devices, Yuzo Yoshikuni, IEEE Journal of Selected Topics in Quantum Electronics, vol. 8, No. 6, Nov./Dec. 2002, pp. 1102-1114.

N X N Arrayed Waveguide Gratings With Improved Frequency Accuracy, Bernasconi, et al., IEEE Journal of Selected Topics in Quantum Electronics, vol. 8, No. 6, Nov./Dec. 2002, pp. 1115-1121.

Integration of waveguide devices aims to reduce costs, Jeff Hecht, Laser Focus World, Sep. 2002, pp. 113-117.

Band architecture improves performance, Marshall, et al., Laser Focus World, Sep. 2002, pp. S7-S10.

Monolithic Integration of a Semiconductor Optical Amplifier and a High Bandwidth p-i-n Photodiode Using Asymmeteric Twin-Waveguide Technology, Xia, et al., IEEE Photonics Technology Letters, vol. 15, No. 3, Mar. 2003, pp. 452-454.

Optical crossconnect architectures for wavelength-routed WDM networks, Xiangdong Qin and Yuanyuan Yang, Optical Networks Magazine, Jul./Aug. 2003, pp. 50-63.

New Multiprotocol WDM/CDMA-Based Optical Switch Architecture, Benhaddou, et al., IEEE, Simulation Symposium 2001 Proceedings, 34th Annual, Apr. 22-26, 2001, pp. 285-291.

OCDMA Promises Disruptive New Metro Network Model, John McIntosh, Fiberoptic Product News, Mar. 2001, pp. 114 and 116.

The ideal light source for datanets, Giboney, et al., IEEE Spectrum, Feb. 1998, pp. 43-53.

VCSELs: Crucial Components in High-Density Interconnection, Sundaram, et al., Fiberoptic Product News, Jan. 2002, pp. 18 and 20.

Surface-Emitting Lasers Enable Parallel Communication, Dr. Stephan Hunziker, et al., EuroPhotonics, Oct./Nov. 2001, pp. 32-33.

Tunable VCSEL provides 2-mW CW output, Paula M. Noaker, Laser Focus World, Jun. 1999, pp. 28 and 30.

High-Speed Wavelength-Division Multiplexing and Demultiplexing Using Monolithic Quasi-Planar VCSEL and Resonant Photodetector Arrays with Strained InGaAs Quantum Wells, Zhou, et al., IEEE Photonics Technology Letters, vol. 12, No. 2, Feb. 2000, pp. 122-124.

The Planar Waveguide Battleground, Dr. Sylvain Charbonneau, et al., Photonics Spectra, Jan. 2002, pp. 138-140.

Widely tunable lasers power up for narrow-spaced DWDM, Mark Telford, Lightwave Europe, May 2002, pp. 24-25.

AWG-Based Metro WDM Networking, Maier, et al., IEEE Optical Communications, Nov. 2004, pp. S19-S26.

Optical interconnection technology in switches, routers, and optical cross connects, Magnus Jonsson, Optical Networks Magazine, Jul./Aug. 2003, pp. 20-34.

Ultra-thin silicon-on-sapphire component technology for short reach parallel optical interconnects, Kuznia, et al., Optical Networks Magazine, Jul./Aug. 2003, pp. 11-19.

Next-Generation Optical Networks as a Value Creation Platform, Hirosaki, et al., IEEE Communications Magazine, Sep. 2003, pp. 65-71.

Advances in Optical Path Crossconnect Systems Using Planar-Lightwave Circuit-Switching Technologies, Aisawa, et al., IEEE Communications Magazine, Sep. 2003, pp. 54-57.
Progress and Prospects of Long-Wavelength VCSELs, Connie J. Chang-Hasnain, IEEE Optical Communications, Feb. 2003, pp. S30-S34.
Parallel Optical Interconnects for Enterprise Class Server Clusters: Needs and Technology Solutions, Trezza, et al., IEEE Optical Communications, Feb. 2003, pp. S36-S42.
Multi-Stage Switching System Using Optical WDM Grouped Links Based on Dynamic Bandwidth Sharing, Oki, et al., IEEE Communications Magazine, Oct. 2003, pp. 56-63.
Routing and restoration architectures in mesh optical networks, Ellinas, et al., Optical Networks Magazine, Jan./Feb. 2003, pp. 91-106.
Tunable Telecom Lasers Promote Flexibility First, Paula M. Powell, Photonics Spectra, Jun. 2004, pp. 84-85.
Direct Writing of Waveguides Is a Versatile Approach to Sensor Technology, Williams, et al., EuroPhotonics, Dec./Jan. 2005, pp. 26-27.
User-Network Interface (UNI) 1.0, Jim Jones, Optical Networks Magazine, Mar./Apr. 2003, pp. 85-93.
Integrated Waveguide Turning Mirror in Silicon-on-Insulator, Tang, et al., IEEE Photonics Technology Letters, vol. 14, No. 1, Jan. 2002, pp. 68-70.
VCSELs turn to high-speed transmission, Jeff Hecht, Laser Focus World, Feb. 2001, pp. 123-130.
Office Action mailed Nov. 9, 2007 for U.S. Appl. No. 11/833,277 of Handelman, filed Aug. 3, 2007 (8 pages).
Office Action mailed May 13, 2008 for U.S. Appl. No. 11/833,251 of Handelman, filed Aug. 3, 2007.
Office Action mailed Aug. 25, 2008 for U.S. Appl. No. 11/833,277 of Handleman, filed Aug. 3, 2007.
Office Action mailed Sep. 9, 2008 for U.S. Appl. No. 11/833,258 of Handleman, filed Aug. 3, 2007 (8 pages).
Office Action mailed May 30, 2008 for U.S. Appl. No. 11/035,732 of Handelman, filed Jan. 18, 2005.
Office Action mailed Oct. 1, 2008 for U.S. Appl. No. 11/833,262 of Handelman, filed Aug. 3, 2007 (9 pages).
Office Action mailed Jan. 25, 2007 for U.S. Appl. No. 11/035,732 of Handelman, filed Jan. 18, 2005 (8 pages).
Office communication mailed Mar. 8, 2007 for U.S. Appl. No. 11/035,732 of Handelman, filed Jan. 18, 2005 (4 pages).
Amendment filed Apr. 4, 2007 in U.S. Appl. No. 11/035,732 of Handelman, filed Jan. 18, 2005 (21 pages).
Office Action mailed Sep. 11, 2007 for U.S. Appl. No. 11/035,732 of Handelman, filed Jan. 18, 2005 (9 pages).
Response filed Oct. 15, 2007 in U.S. Appl. No. 11/035,732 of Handelman, filed Jan. 18, 2005 (9 pages).
Office Action mailed Jan. 2, 2008 for U.S. Appl. No. 11/035,732 of Handelman, filed Jan. 18, 2005 (10 pages).
Amendment filed Jan. 17, 2008 in U.S. Appl. No. 11/833,277 of Handelman, filed Aug. 3, 2007 (9 pages).
Response filed Jan. 23, 2008 in U.S. Appl. No. 11/035,732 of Handelman, filed Jan. 18, 2005 (9 pages).
Amendment filed Jul. 8, 2008 in U.S. Appl. No. 11/833,277 of Handelman, filed Aug. 3, 2007 (8 pages).
Amendment filed Jul. 25, 2008 in U.S. Appl. No. 11/833,251 of Handelman, filed Aug. 3, 2007 (9 pages).
Amendment filed Jul. 31, 2008 in U.S. Appl. No. 11/035,732 of Handelman, filed Jan. 18, 2005 (13 pages).
Final Office Action mailed Oct. 30, 2008 for U.S. Appl. No. 11/833,251 of Handelman, filed Aug. 3, 2007 (10 pages).
Office Action mailed Dec. 10, 2008 for U.S. Appl. No. 11/035,732 of Handelman, filed Jan, 18, 2005 (9 pages).
Amendment filed Dec. 23, 2008 in U.S. Appl. No. 11/035,732 of Handelman, filed Jan. 18, 2005 (12 pages).
Notice of Allowance and Fee(s) Due and attached papers mailed Jan. 27, 2009 for U.S. Appl. No. 11/035,732 of Handelman, filed Jan. 18, 2005 (8 pages).

* cited by examiner

PHOTONIC INTEGRATED CIRCUIT DEVICE AND ELEMENTS THEREOF

CROSS-REFERENCE TO RELATED APPLICATIONS

The present application is a continuation of U.S. patent application Ser. No. 11/035,732, filed Jan. 18, 2005.

FIELD OF THE INVENTION

The present invention generally relates to photonic integrated circuit (PIC) devices with optical interconnects and to elements thereof.

BACKGROUND OF THE INVENTION

Increase of communication capacity within chips, boards, modules, and subsystems of chips is limited today due to the electrical interconnects that are used in the chips, boards, modules, and subsystems of chips. Optical interconnects are considered as enabling better performance than electrical interconnects, for example in terms of bandwidth and susceptibility to electromagnetic noise, and therefore photonic integrated circuit (PIC) devices that use optical interconnects have been developed.

PIC devices and optical interconnects for optical backplanes and chip-to-chip communication are described in the following publications:

Published US Patent application US2004/0067006 A1 of Welch et al, which describes transmitter photonic integrated circuit (TXPIC) chips;

an article entitled "Linking with Light", by Neil Savage, in *IEEE Spectrum*, August 2002, pages 32-36;

an article entitled "Self-Organized Lightwave Network Based on Waveguide Films for Three-Dimensional Optical Wiring Within Boxes", by Yoshimura et al in *Journal of Lightwave Technology*, Vol. 22, No. 9, September 2004, pages 2091-2099;

an article entitled "Board-Level Optical Interconnection and Signal Distribution Using Embedded Thin-Film Optoelectronic Devices", by Cho et al in *Journal of Lightwave Technology*, Vol. 22, No. 9, September 2004, pages 2111-2118;

an article entitled "Optical Backplane System Using Waveguide-Embedded PCBs and Optical Slots", by Yoon et al in *Journal of Lightwave Technology*, Vol. 22, No. 9, September 2004, pages 2119-2127;

an article entitled "PCB-Compatible Optical Interconnection Using 45°-Ended Connection Rods and Via-Holed Waveguides", by Rho et al in *Journal of Lightwave Technology*, Vol. 22, No. 9, September 2004, pages 2128-2134; and an article entitled "Board-to-Board Optical Interconnection System Using Optical Slots", by Cho et al in *IEEE Photonics Technology Letters*, Vol. 16, No. 7, July 2004, pages 1754-1756.

Further aspects of technologies and related art that may be useful in understanding the present invention are described in the following publications:

Implementation Agreement OIF-TL-01.1 entitled "Tunable Laser Implementation Agreement", Selvik et al, of the Physical and Link Layer (PLL) Working Group of the Optical Internetworking Forum (OIF), dated 27 Nov. 2002 at the web site www.oiforum.com/public/impagreements.html;

Implementation Agreement OIF-TLMSA-01.1 entitled "Multi-Source Agreement for CW Tunable Lasers", Jeff Hutchins et al, of the Physical and Link Layer (PLL) Working Group of the Optical Internetworking Forum (OIF), dated 30 May 2003 at the web site www.oiforum.com/public/impagreements.html;

Implementation Agreement OIF-ITLA-MSA-01.1 entitled "Integratable Tunable Laser Assembly Multi Source Agreement", Jeff Hutchins et al, Optical Internetworking Forum (OIF), dated 15 Jun. 2004 at the web site www.oiforum.com/public/impagreements.html;

An OIF document entitled "OIF Tunable Laser Projects", by Jeff Hutchins at the web site www.oiforum.com/public/whitepapers.html;

an article entitled "Standardizing Tunable Lasers", by Jeff Hutchins in *Photonics Spectra*, June 2004, pages 88-92;

an article entitled "Surface-Emitting Laser—Its Birth and Generation of New Optoelectronics Field", by Kenichi Iga, in *IEEE Journal on Selected Topics in Quantum Electronics*, Vol. 6, No. 6, November/December 2000, pages 1201-1215;

an article entitled "VCSELs turn to high-speed transmission", by Jeff Hecht in *Laser Focus World*, February 2001, pages 123-130;

an article entitled "Packet switching takes steps toward optical", by Jeff Hecht in *Laser Focus World*, June 2002, pages 131-139;

an article entitled "Optical Signal Processing for Optical Packet Switching Networks", by Blumenthal et al in *IEEE Optical Communications*, February 2003, pages S23-S29;

an article entitled "Restoration schemes for agile photonic networks", by Peter Roorda et al in *Lightwave Europe*, August 2003, pages 10-12;

an article entitled "Photonic Crystals Show Promise for Wiring Optical Chips", by Dr. Dominic F. G. Gallagher in *EuroPhotonics, February/March* 2004, pages 20-21;

an article entitled "A Novel Polarization Splitter Based on the Photonic Crystal Fiber With Nonidentical Dual Cores", by Zhang et al in *IEEE Photonics Technology Letters*, Vol. 16, No. 7, July 2004, pages 1670-1672;

an article entitled "Photonic Crystals: A Growth Industry", by Daniel C. McCarthy in *Photonics Spectra*, June 2002, pages 54-60;

an article entitled "IETF Work on Protection and Restoration for Optical Networks", by David W. Griffith in *Optical Networks Magazine*, July/August 2003, pages 101-106;

an article entitled "All-Optical Switching Technologies for Protection Applications", by Appelman et al in *IEEE Optical Communications*, November 2004, pages S35-S40;

Chapter 6 on pages 57-72 in *The Fiber Optic LAN Handbook*, Fifth Edition, Codenol® Technology Corporation, 1993;

The following chapters in *The Communications Handbook*, CRC Press & IEEE Press, 1997, Editor-in-Chief Jerry D. Gibson: Chapter 57 on pages 774-788; Chapter 60 on pages 824-831; and Chapter 64 on pages 872-882;

U.S. patent application Ser. No. 10/619,413 of Handelman, filed 16 Jul. 2003, now U.S. Pat. No. 7,167,620, which describes devices and methods for all-optical processing and storage;

The following published US Patent Applications: US 2003/0048506 A1; US 2003/0043430 A1; US 2002/0048067 A1; US 2004/0184714 A1; and US 2004/0208418 A1; and The following U.S. Pat. Nos. 6,404,522; 6,574,018; 6,738,581; and 6,763,191.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, seeks to provide photonic integrated circuit (PIC) devices with improved functionality, structure and capabilities, particularly, but not only, with respect to architecture of the PIC devices, configurability of the PIC devices, communication between optical transceivers comprised in or associated with the PIC devices, protection and restoration of communication between optical transceivers comprised in or associated with the PIC devices, and operability of the PIC devices and of optical transceivers comprised in or associated with the PIC devices.

The term "optical transceiver" is used throughout the present specification and claims to include a combination of an optical transmitter and an optical receiver.

The term "optical transmitter" is used throughout the present specification and claims to include a light emitting element that is capable of transmitting optical signals and at least part of an electronic circuit that modulates, drives and controls the light emitting element. The light emitting element is modulated either by direct modulation or by external modulation and the at least part of the electronic circuit includes a respective modulation circuit. In a case where the light emitting element is modulated by external modulation, the optical transmitter also includes an external modulator. Examples, which are not meant to be limiting, of light emitting elements of appropriate optical transmitters include the following: a laser; and a light-emitting diode (LED).

The term "optical receiver" is used throughout the present specification and claims to include a light sensitive element that is capable of receiving optical signals and at least part of an electronic circuit that converts received optical signals into electronic signals and controls the light sensitive element. Examples, which are not meant to be limiting, of light sensitive elements of appropriate optical receivers include the following: a photodiode (PD); and a photo-detector.

Further objects and features of the present invention will become apparent to those skilled in the art from the following description and the accompanying drawings.

There is thus provided in accordance with a preferred embodiment of the present invention a photonic integrated circuit (PIC) device including a set of optical transceivers including optical transmitters and optical receivers, and an embedded optical interconnect mesh operatively associated with the set of optical transceivers and structured to enable at least one of the following network architectures: a star network architecture, a bus/broadcast network architecture, and a ring network architecture.

Additionally, the PIC device also includes an interface unit associating the set of optical transceivers with at least one of the following: subsystems of an electronic chip which communicate with each other via the set of optical transceivers, and a set of electronic chips which communicate with each other via the set of optical transceivers.

Further additionally, the PIC device also includes a link adder operative to associate an external optical unit with the embedded optical interconnect mesh so as to enable the external optical unit to function in the network architecture enabled by the embedded optical interconnect mesh. The external optical unit preferably includes at least one of the following: an external optical transceiver, an external optical network, an external optical switch, an external optical router, an external optical linecard, an external PIC device, an external optical processing element, an external optical decoder, and a PIC monitoring system.

Preferably, the embedded optical interconnect mesh includes at least one of the following: a free-space optical interconnect mesh, a waveguide optical interconnect mesh, a fiber interconnect mesh, a photonic crystal waveguide optical interconnect mesh, and a combination of at least two of the following: a free-space optical interconnect mesh, a waveguide optical interconnect mesh, a fiber interconnect mesh, and a photonic crystal waveguide optical interconnect mesh. The waveguide optical interconnect mesh preferably includes at least one polymeric optical waveguide.

Preferably, each optical transmitter in the set of optical transceivers includes at least one of the following: a multi-channel laser array, a light emitting diode (LED), a tunable laser, a fixed-channel laser, and a tunable multi-channel laser array. Each optical receiver in the set of optical transceivers preferably includes at least one of the following: a photodiode (PD), and a photo-detector. The photodiode preferably includes at least one of the following: a p-i-n photodiode, and an avalanche photodiode (APD). The photo-detector preferably includes a metal-semiconductor-metal (MSM) photo-detector.

Additionally, the PIC device also includes stacked layers which include the following: at least a portion of optical transceivers in the set of optical transceivers, and at least a portion of the embedded optical interconnect mesh.

Preferably, the set of optical transceivers includes at least one optical transceiver which is used for providing at least one of communication protection and communication restoration. At least one optical transceiver in the set of optical transceivers which is not used for providing at least one of communication protection and communication restoration and the at least one optical transceiver which is used for providing at least one of communication protection and communication restoration are preferably at least partially included in at least one of the following: separate layers of the PIC device, and separate areas of the PIC device.

Preferably, the embedded optical interconnect mesh includes a reflecting optical element, and a bidirectional coupler including: a plurality of ports on a first side which are coupled to the set of optical transceivers, and at least one port on a second side which is coupled to the reflecting optical element, wherein light transmitted by an optical transmitter in the set of optical transceivers via a port on the first side is reflected by the reflecting optical element and distributed among the optical receivers in the set of optical transceivers via the at least one port on the second side which is coupled to the reflecting optical element, and via ports on the first side that are associated with the optical receivers. The bi-directional coupler preferably includes a star coupler (SC).

The PIC device also preferably includes isolators operatively associated with the optical transmitters in the set of optical transceivers and operative to protect the optical transmitters from back reflections from the reflecting optical element.

The PIC device may preferably be included in a photonic switch.

There is also provided in accordance with a preferred embodiment of the present invention an optical interconnect including a plurality of optical paths, a reflecting optical element, and a bidirectional coupler including: a plurality of ports on a first side which are coupled to the plurality of optical paths, and at least one port on a second side which is coupled to the reflecting optical element, wherein light transmitted via an optical path of the plurality of optical paths and a port on the first side is reflected by the reflecting optical element and distributed among the plurality of optical paths via the at least one port on the second side which is coupled to the reflecting optical element, and via ports on the first side that are coupled to the plurality of optical paths.

Also in accordance with a preferred embodiment of the present invention there is provided a tunable laser module including a light emitter, and a register storing an indication that the tunable laser module is assigned to provide at least one of communication protection and communication restoration for at least one of the following: at least a portion of a separate optical transmitter, and at least a portion of an optical communication system.

Preferably, the indication includes an identification of at least one of the following: the at least a portion of the separate optical transmitter, and the at least a portion of the optical communication system.

Further preferably, the register stores an identification of at least one channel wavelength over which the at least one of communication protection and communication restoration is provided.

Preferably, the separate optical transmitter includes at least one of the following: a VCSEL, a LED, an EEL, a tunable laser, a fixed-channel laser, and a tunable VCSEL.

Further in accordance with a preferred embodiment of the present invention there is provided a tunable laser module including a circuit structure which is at least partially embedded in a PIC device, the circuit structure including at least a portion of the tunable laser module, and a register storing an indication identifying a location within the PIC device in which the circuit structure is located.

Preferably, the indication identifying the location within the PIC device includes at least one of the following: an indication of a layer of the PIC device in which the circuit structure is included, and an indication of an area of the PIC device in which the circuit structure is located.

Yet further in accordance with a preferred embodiment of the present invention there is provided a PIC device including a first optical transceiver, a second optical transceiver, and a register storing an indication indicating that the first optical transceiver is assigned to provide at least one of communication protection and communication restoration for the second optical transceiver.

Still further in accordance with a preferred embodiment of the present invention there is provided a multi-channel laser array module including a light emitting array capable of simultaneously transmitting in a plurality of channel wavelengths within at least one wavelength band, and a register storing an identification of at least one channel wavelength of the plurality of channel wavelengths which is unusable by the multi-channel laser array module. The at least one unusable channel wavelength may preferably include at least one channel wavelength which is temporarily unusable.

Preferably, the light emitting array includes at least one of the following: a VCSEL array, a tunable VCSEL array, an EEL array, an assembly combining a plurality of fixed-channel lasers, and an assembly combining a plurality of tunable single-channel lasers.

There is also provided in accordance with a preferred embodiment of the present invention a tunable laser module including a light emitter capable of selectively transmitting in any one of a plurality of channel wavelengths within at least one wavelength band, and a register storing an identification of at least one channel wavelength of the plurality of channel wavelengths which is unusable by the tunable laser module. The at least one unusable channel wavelength may preferably include at least one channel wavelength which is temporarily unusable.

Further in accordance with a preferred embodiment of the present invention there is provided a tunable laser module including a light emitter, and a register storing at least one bit enabling return from a current channel grid configuration of the tunable laser module to at least one of the following: a previous channel grid configuration, and a default channel grid configuration.

Also in accordance with a preferred embodiment of the present invention there is provided a PIC device including a first multi-channel laser array module capable of simultaneously transmitting over a first set of channel wavelengths, a second multi-channel laser array module capable of simultaneously transmitting over a second set of channel wavelengths, where the channel wavelengths of the second set are different from the channel wavelengths of the first set, an optical receiver capable of simultaneously receiving transmissions from the first multi-channel laser array module over the first set of channel wavelengths and from the second multi-channel laser array module over the second set of channel wavelengths, and an embedded optical interconnect mesh which optically interconnects the first multi-channel laser array module and the second multi-channel laser array module to the optical receiver.

Preferably, the second multi-channel laser array module, or a portion thereof, provides at least one of communication protection and communication restoration for the first multi-channel laser array module.

Further in accordance with a preferred embodiment of the present invention there is provided an optical interconnection method for use with a PIC device, the method including embedding, within the PIC device, an optical interconnect mesh structured to enable at least one of the following network architectures: a star network architecture, a bus/broadcast network architecture, and a ring network architecture.

Additionally, the method also includes associating the optical interconnect mesh with a set of optical transceivers.

Further additionally, the method also includes associating the set of optical transceivers with at least one of the following: subsystems of an electronic chip which communicate with each other via the set of optical transceivers, and a set of electronic chips which communicate with each other via the set of optical transceivers.

Still further additionally, the method also includes associating an external optical unit with the optical interconnect mesh so as to enable the external optical unit to function in the network architecture enabled by the optical interconnect mesh.

The method also preferably includes using at least one optical transceiver from the set of optical transceivers for providing at least one of communication protection and communication restoration.

Additionally, the method also includes selecting at least one channel wavelength usable by the at least one optical transceiver for providing the at least one of communication protection and communication restoration over the at least one channel wavelength.

There is also provided in accordance with a preferred embodiment of the present invention an optical interconnection method for use with a PIC device, the method including embedding, within the PIC device, an optical interconnect mesh structured to enable a configurable network architecture, and enabling reconfiguration from a first network architecture to a second network architecture.

Preferably, each of the first network architecture and the second network architecture includes one of the following network architectures: a star network architecture, a bus/broadcast network architecture, and a ring network architecture.

Also in accordance with a preferred embodiment of the present invention there is provided an indication method usable with a tunable laser module, the method including storing an indication that the tunable laser module is assigned to provide at least one of communication protection and communication restoration.

Additionally, the method also includes providing the at least one of communication protection and communication restoration for at least one of the following: at least a portion of a separate optical transmitter, and at least a portion of an optical communication system.

Preferably, the indication includes an identification of at least one of the following: the at least a portion of the separate optical transmitter, and the at least a portion of the optical communication system.

Additionally, the method also includes storing an identification of at least one channel wavelength over which the at least one of communication protection and communication restoration is provided.

The storing preferably includes storing the indication in at least one of the following: a register of the tunable laser module, a register of the separate optical transmitter, and a control and management system of the optical communication system. Additionally, the storing includes storing an identification of a channel wavelength over which the at least one of communication protection and communication restoration is provided in at least one of the following: a register of the tunable laser module, a register of the separate optical transmitter, and a control and management system of the optical communication system.

Further in accordance with a preferred embodiment of the present invention there is provided an indication method usable with an optical transmitter, the method including at least partially embedding in a PIC device a circuit structure including at least a portion of the optical transmitter, and storing an indication identifying a location within the PIC device in which the circuit structure is located. The optical transmitter preferably includes at least one of the following: a tunable laser module, and a multi-channel laser array module.

There is also provided in accordance with a preferred embodiment of the present invention an identification method usable with a tunable laser module which is capable of selectively transmitting in any one of a plurality of channel wavelengths within at least one wavelength band, the method including storing an identification of at least one channel wavelength of the plurality of channel wavelengths which is unusable by the tunable laser module.

Further in accordance with a preferred embodiment of the present invention there is provided a method for enabling return to a state in a tunable laser module, the method including storing at least one bit enabling return from a current channel grid configuration of the tunable laser module to at least one of the following: a previous channel grid configuration, and a default channel grid configuration.

Yet further in accordance with a preferred embodiment of the present invention there is provided an identification method usable with a multi-channel laser array module which is capable of simultaneously transmitting in a plurality of channel wavelengths within at least one wavelength band, the method including storing an identification of at least one channel wavelength of the plurality of channel wavelengths which is unusable by the multi-channel laser array module.

Still further in accordance with a preferred embodiment of the present invention there is provided an indication method usable with a multi-channel laser array module, the method including storing an indication that at least one single-channel laser in the multi-channel laser array module is assigned to provide at least one of communication protection and communication restoration.

Additionally, the method also includes providing the at least one of communication protection and communication restoration for at least one of the following: at least a portion of a separate optical transmitter, at least a portion of an optical communication system, and a portion of the multi-channel laser array module that does not include the at least one single-channel laser.

There is also provided in accordance with a preferred embodiment of the present invention a method for verifying optical functionality of an optical transmitter in a PIC device which includes a plurality of optical transmitters and a plurality of optical receivers, the method including transmitting from the optical transmitter, via the PIC device, an optical signal which is individually assigned to the optical transmitter, and determining whether the individually assigned optical signal is correctly received at at least one of the plurality of optical receivers.

Further in accordance with a preferred embodiment of the present invention there is provided a method for providing at least one of communication protection and communication restoration in a PIC device, the method including embedding, within the PIC device, an optical interconnect mesh structured to enable a network architecture in which optical transceivers associated with the optical interconnect mesh communicate with each other, determining a first sub-group of the optical transceivers as a sub-group of active optical transceivers for use in normal communication, and assigning, in response to a determination of the first sub-group, a second sub-group of the optical transceivers as a protecting sub-group of optical transceivers for providing at least one of communication protection and communication restoration for the first sub-group.

Preferably, the assigning includes automatically assigning the second sub-group of the optical transceivers as the protecting sub-group of optical transceivers.

Additionally, the method also includes maintaining an identification of the first sub-group and an identification of the second sub-group at a control and management system.

Also in accordance with a preferred embodiment of the present invention there is provided an optical receiving method for use with a PIC device, the method including embedding in the PIC device a first multi-channel laser array module capable of simultaneously transmitting over a first set of channel wavelengths, and a second multi-channel laser array module capable of simultaneously transmitting over a second set of channel wavelengths, where the channel wavelengths of the second set are different from the channel wavelengths of the first set, and simultaneously receiving at an optical receiver, via an optical interconnect mesh in the PIC device which interconnects the optical receiver to the first multi-channel laser array module and to the second multi-channel laser array module, transmissions provided by the first multi-channel laser array module over the first set of channel wavelengths and transmissions provided by the second multi-channel laser array module over the second set of channel wavelengths.

There is also provided in accordance with a preferred embodiment of the present invention an optical switching method including determining, from a plurality of optical packets, a first group of optical packets that can be switched by a flow-switching technique (FST) and a second group of optical packets that cannot be switched by FST, and switching the first group of optical packets by using FST and the second group of optical packets by using packet switching.

Preferably, the first group of optical packets includes at least one of the following: at least one optical burst that exceeds a packet-length threshold, and at least one optical packet that is combinable with other optical packets.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

The present invention, in preferred embodiments thereof, seeks to provide photonic integrated circuit (PIC) devices with improved functionality, structure and capabilities, particularly, but not only, with respect to architecture of the PIC devices, configurability of the PIC devices, communication between optical transceivers comprised in or associated with the PIC devices, protection and restoration of communication between optical transceivers comprised in or associated with the PIC devices, and operability of the PIC devices and of optical transceivers comprised in or associated with the PIC devices. Such PIC devices may, for example, be useful as building blocks or entire systems in various applications including, for example which is not meant to be limiting, the following applications: optical switching and routing applications; applications involving chip-to-chip communication; applications involving linecard-to-linecard communication and optical backplane applications; applications involving interchip communication; optical processing applications; optical decoding applications; and applications that use optical links and optical communication.

The term "photonic integrated circuit device" is used throughout the present specification and claims in a broad sense to include an optoelectronic circuit comprising optical interconnects and also comprising optoelectronic elements or portions thereof, or a device including such an optoelectronic circuit. The photonic integrated circuit device also includes or is associated with a conventional large-scale integrated (LSI) electronic circuit or conventional LSI components. The photonic integrated circuit device is suitable for integration into a hybrid electrical-optical printed circuit board (PCB) or is integrated into a hybrid electrical-optical PCB. Each optical interconnect in the photonic integrated circuit device includes at least one of the following: a free-space optical interconnect; a waveguide optical interconnect; a fiber interconnect; and an optical interconnect based on photonic crystal waveguides.

A PIC device in accordance with a preferred embodiment of the present invention includes a set of optical transceivers comprising optical transmitters and optical receivers, and an embedded optical interconnect mesh operatively associated with the set of optical transceivers and structured to enable at least one of the following network architectures: a star network architecture; a bus/broadcast network architecture; and a ring network architecture.

Figure 1:
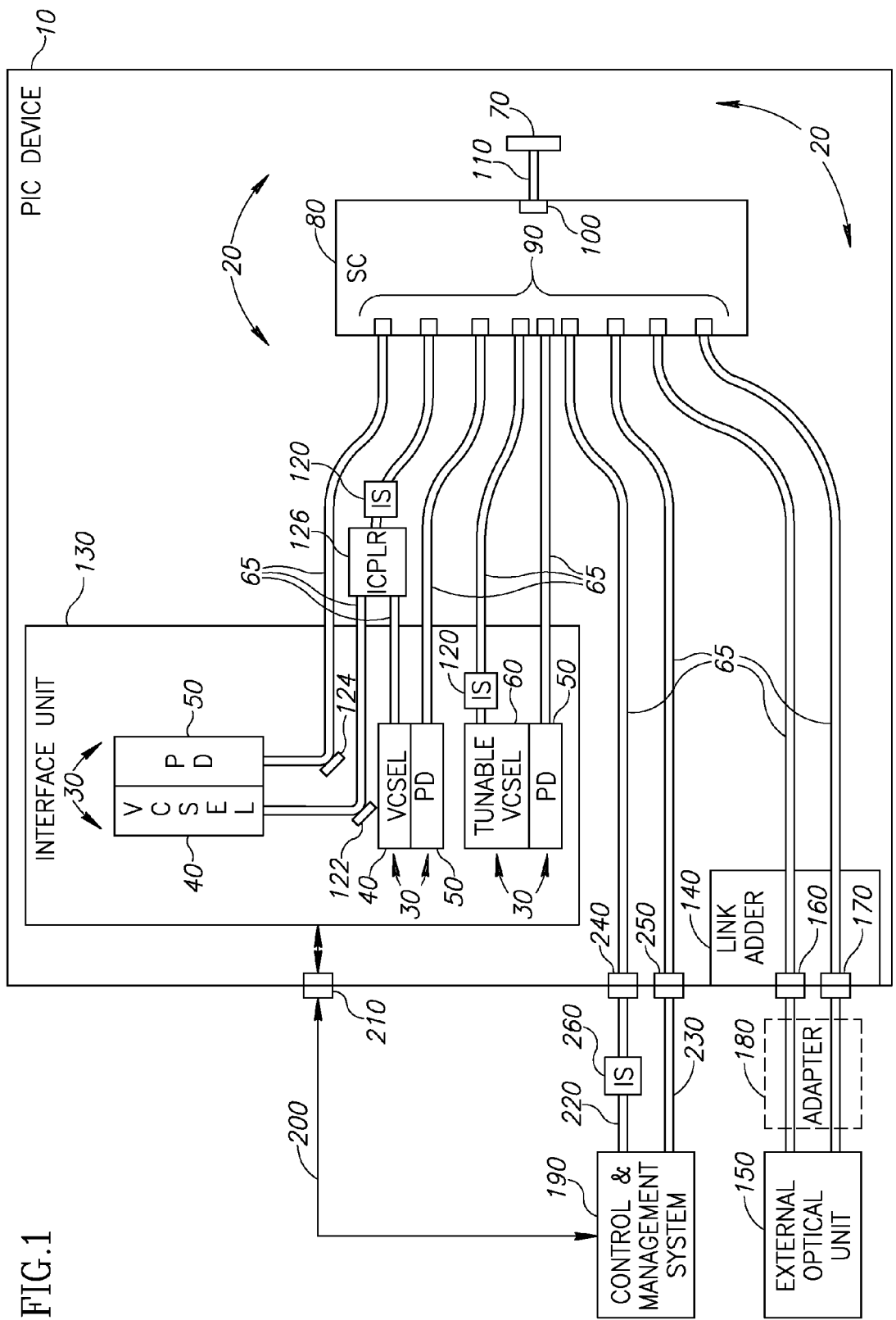
FIG. 1 is a simplified partly pictorial partly block diagram illustration of a preferred implementation of a photonic integrated circuit (PIC) device with an embedded optical interconnect mesh structured to enable a configurable network architecture, the PIC device being constructed and operative in accordance with a preferred embodiment of the present invention.

Reference is now made to FIG. 1, which is a simplified partly pictorial partly block diagram illustration of a preferred implementation of a PIC device 10 with an embedded optical interconnect mesh 20 structured to enable a configurable network architecture, the PIC device 10 being constructed and operative in accordance with a preferred embodiment of the present invention. Preferably, the configurable network architecture enables reconfiguration from a first network architecture to a second network architecture where each of the first network architecture and the second network architecture preferably includes one of the following network architectures: a star network architecture; a bus/broadcast network architecture; and a ring network architecture. The PIC device 10 is preferably operative in each of the star network architecture, the bus/broadcast network architecture, and the ring network architecture as described below.

The PIC device 10 preferably includes a set of optical transceivers 30 comprising a plurality of optical transmitters 40 and a plurality of optical receivers 50. The set of optical transceivers 30 is preferably associated with the optical interconnect mesh 20. By way of example, which is not meant to be limiting, the plurality of optical transmitters 40 in FIG. 1 include vertical cavity surface-emitting lasers (VCSELs), or multi-channel arrays thereof with combined optical outputs, and a tunable single-channel or multi-channel optical transmitter 60 comprising a tunable VCSEL, and the plurality of optical receivers 50 include photodiodes (PDs), or arrays of PDs with combined optical inputs. Each PD preferably includes at least one of the following: a p-i-n photodiode; and an avalanche photodiode (APD).

It is however appreciated that each of the plurality of optical transmitters 40 may alternatively or additionally include any other appropriate type of optical transmitter, such as a single-channel or multi-channel array configuration of at least one of the following types: a light emitting diode (LED); an edge-emitting laser (EEL); a tunable laser; and a fixed-channel laser. Each of the plurality of optical receivers 50 may alternatively or additionally include any other appropriate type of optical receiver, such as a photo-detector including, for example which is not meant to be limiting, a metal-semiconductor-metal (MSM) photo-detector.

The embedded optical interconnect mesh 20 preferably includes a plurality of optical paths 65, a reflecting optical element 70, and a bi-directional coupler 80. The optical paths 65 may be referred to as branches or segments of the optical interconnect mesh 20.

The bi-directional coupler 80 preferably includes a star coupler (SC) having a plurality of ports 90 on a first side and at least one port 100 on a second side. The ports 90 are preferably coupled to the set of optical transceivers 30 via the optical paths 65, and the at least one port 100 is preferably coupled to the reflecting optical element 70 via an optical path 110. By way of example, which is not meant to be limiting, the bi-directional coupler 80 in FIG. 1 includes a single port 100.

The reflecting optical element 70 preferably includes a mirror, such as a micro-mirror, which is preferably inserted in a "via" hole (not shown) in the PIC device 10 so that a reflecting facet of the micro-mirror is perpendicular to the optical path 110 thus reflecting light propagating via the optical path 110 towards the micro-mirror back along the same path.

Preferably, the PIC device 10 also includes a plurality of isolators 120 operatively associated with or comprised in the optical transmitters 40 and 60. The isolators 120 are preferably operative to protect the optical transmitters 40 and 60 from back reflections of light from the reflecting optical element 70.

The embedded optical interconnect mesh 20 preferably includes at least one of the following: a free-space optical interconnect mesh; a waveguide optical interconnect mesh; a fiber interconnect mesh; a photonic crystal waveguide optical interconnect mesh; and a combination of at least two of the following: a free-space optical interconnect mesh; a waveguide optical interconnect mesh; a fiber interconnect mesh; and a photonic crystal waveguide optical interconnect mesh. The waveguide optical interconnect mesh preferably includes at least one polymeric optical waveguide.

It is appreciated that at least a portion of the embedded optical interconnect mesh 20 and at least a portion of optical transceivers 30 in the set of optical transceivers 30 are preferably comprised in stacked layers of the PIC device 10. Additionally, the optical transceivers 30 in the set of optical transceivers 30 may be spread throughout large portions of the PIC device 10 and placed in various areas of the PIC device 10 and in various orientations. Thus, the embedded optical interconnect mesh 20 may comprise complex structures of the optical paths 65 in two or three dimensions with, for example, reflectors at corners of some optical paths 65 for deflecting light, and intermediate couplers among some of the optical transceivers 30 and the bidirectional coupler 80.

By way of example, which is not meant to be limiting, in FIG. 1 one optical transceiver 30 is shown to have a different orientation than the other optical transceivers 30, and a mirror 122 is used to deflect light emanating from the optical transmitter 40 of the one optical transceiver 30 and another mirror 124 is used to deflect light towards the optical receiver 50 of the one optical transceiver 30. It is appreciated that additional mirrors may be used, as necessary, in the PIC device 10 to direct transmitted optical signals towards the reflecting optical element 70, and optical signals reflected by the reflecting optical element 70 towards corresponding optical receivers 50.

Further by way of example, which is not meant to be limiting, in FIG. 1 an intermediate coupler (ICPLR) 126 is used between the bidirectional coupler 80 and two optical transmitters 40, and a single isolator 120, placed between the ICPLR 126 and the bi-directional coupler 80, is used for protecting the two optical transmitters 40 from back reflections of light from the reflecting optical element 70. It is appreciated that use of the ICPLR 126 reduces the number of isolators 120 in the PIC device 10 and the number of ports 90 used in the bidirectional coupler 80, and also reduces received optical power of back reflections received at the optical transmitters 40 due to distribution by the ICPLR 126. The ICPLR 126 may, for example, include a star coupler having two input ports (not shown) and one output port (not shown).

The PIC device 10 also preferably includes an interface unit 130. The interface unit 130 preferably associates the set of optical transceivers 30 with at least one of the following: subsystems of an electronic chip (not shown) which communicate with each other via the set of optical transceivers 30; and a set of electronic chips (not shown) which communicate with each other via the set of optical transceivers 30. The subsystems of the electronic chip and the set of electronic chips may be comprised in the PIC device 10 or associated with the PIC device 10.

The interface unit 130 may, for example, be embedded in a layer of the PIC device 10 which is under the optical transceivers 30. Alternatively, the interface unit 130 may be adjacent to the optical transceivers 30. The interface unit 130 may, for example, include LSI electronic circuit components (not shown) interfacing the subsystems of the electronic chip and the electronic chips with the optical transceivers 30. Additionally, the interface unit 130 includes at least part of an electronic circuit which modulates, drives, and controls the optical transmitters 40 and 60, and at least part of an electronic circuit that converts received optical signals into electronic signals and controls the optical receivers 50. It is appreciated that the interface unit 130 may be comprised of separate electronic sub-circuits.

Preferably, each optical transceiver 30, together with a corresponding associated portion of the interface unit 130 and a corresponding isolator 120, forms an opto-electronic (OE) node in the network architecture of the PIC device 10. Each such portion of the interface unit 130 which is associated with an optical transceiver 30 preferably includes or is associated with a processing element (not shown) capable of performing network processing operations that are associated with a conventional network, such as detection of an address of a node, re-transmission of information received at the node, etc.

The PIC device 10 also preferably includes a link adder 140. The link adder 140 is preferably operative to associate an external optical unit 150 with the optical interconnect mesh 20 so as to enable the external optical unit 150 to function in the network architecture enabled by the optical interconnect mesh 20. The external optical unit 150 is preferably associated with the optical interconnect mesh 20 via ports 160 and 170 in the link adder 140. By way of example, the external optical unit 150 provides optical signals to the PIC device 10 via the port 160 and receives optical signals from the PIC device 10 via the port 170. It is appreciated that the link adder 140 may optionally include a switch (not shown) which in an on state connects the external optical unit 150 to the PIC device 10 and in an off state disconnects the external optical unit 150 from the PIC device 10.

The external optical unit 150 preferably includes a processing element (not shown) capable of performing network processing operations that are associated with a conventional network, such as detection of an address of the external optical unit 150, re-transmission of information received at the external optical unit 150, etc. The external optical unit 150 also preferably includes at least one of the following (all not shown): an external optical transceiver; an external optical network; an external optical switch; an external optical router; an external optical linecard; an external PIC device; an external optical processing element; an external optical decoder; and a PIC monitoring system.

The external optical unit 150 may additionally include an isolator (not shown) for protecting a transmitting element (not shown) of the external optical unit 150 from back reflections of light from the reflecting optical element 70. Alternatively, the isolator of the external optical unit 150 may be replaced by an isolator (not shown) associated with the port 160 of the link adder 140.

In a case where the PIC device 10 and the external optical unit 150 operate on optical signals having different characteristics, an adapter 180 which interfaces to the link adder 140 and to the external optical unit 150 may preferably be used to adapt characteristics of the optical signals. For example, if the external optical unit 150 uses optical transceivers that transmit at a first wavelength band, such as a wavelength band around 1.55 µm, and the optical transceivers 30 in the PIC device 10 transmit at a second wavelength band, such as a wavelength band around 0.85 µm, the adapter 180 preferably converts wavelengths of optical signals outputted from the external optical unit 150 towards the PIC device 10 to wavelengths in the second wavelength band, and wavelengths of optical signals outputted from the PIC device 10 towards the external optical unit 150 to wavelengths in the first wavelength band. It is appreciated that wavelength conversion is preferably performed by conventional wavelength converters (not shown) in the adapter 180. It is further appreciated that the adapter 180 may include other appropriate means (not shown) for adapting other characteristics of the optical signals.

In a case where the external optical unit 150 and the PIC device 10 use optical signals having similar characteristics, the adapter 180 is optional.

Preferably, the PIC device 10 is operatively associated with a control and management system 190. The control and management system 190 is external to the PIC device 10. Alternatively, part of the control and management system 190 may be comprised in the PIC device 10.

The control and management system 190 preferably controls and manages the PIC device 10 via at least one of the following: an electrical interconnect 200 connected to the interface unit 130 via a port 210; and optical interconnects 220 and 230 respectively connected to the bidirectional coupler 80 via ports 240 and 250 and corresponding optical paths 65. In a case where the control and management system 190 controls and manages the PIC device 10 via the electrical interconnect 200, the electrical interconnect 200 preferably transfers control and management electronic signals from the control and management system 190 to the optical transceivers 30, and response electronic signals from the optical transceivers 30 to the control and management system 190.

In a case where the control and management system 190 controls and manages the PIC device 10 via the optical interconnects 220 and 230, the control and management system 190 preferably operates as an OE node that transmits and receives information via the optical interconnect mesh 20. It is appreciated that an isolator 260 is preferably used to protect a transmitting portion of the control and management system 190 from back reflections of light from the reflecting optical element 70.

It is further appreciated that the control and management system 190 may also preferably control the adapter 180.

Preferably, the set of optical transceivers 30 includes at least one optical transceiver 30 which is used for providing at least one of communication protection and communication restoration. Communication protection and communication restoration are both types of recovery schemes as described in the above-mentioned article entitled "IETF Work on Protection and Restoration for Optical Networks", by David W. Griffith in *Optical Networks Magazine*, July/August 2003, pages 101-106, the disclosure of which is hereby incorporated herein by reference.

Preferably, at least one optical transceiver 30 in the set of optical transceivers 30 which is not used for providing at least one of communication protection and communication restoration and the at least one optical transceiver 30 which is used for providing at least one of communication protection and communication restoration are at least partially comprised in separate layers of the PIC device 10 and/or separate areas of the PIC device 10.

It is appreciated that the PIC device 10 may also preferably include additional optical elements (not shown) that transmit and receive optical signals via the network architecture of the PIC device 10. The additional optical elements may include, for example which is not meant to be limiting, at least one of the following: at least one electro-optic (EO) switch; and at least one optical processing element. Each additional optical element preferably includes a processing element capable of performing network processing operations that are associated with a conventional network, such as detection of an address of the additional optical element, re-transmission of information received at the additional optical element, etc.

In operation, each optical transceiver 30 together with a corresponding associated portion of the interface unit 130 and a corresponding isolator 120 operates as an OE node in a network of the PIC device 10 which is based on the network architecture enabled by the optical interconnect mesh 20. The OE node preferably uses the optical transmitter 40 or 60 of the optical transceiver 30 to transmit optical signals to other OE nodes of the PIC device 10, and the optical receiver 50 of the optical transceiver 30 to receive optical signals from other OE nodes of the PIC device 10. The processing element associated with or comprised in the portion of the interface unit 130 associated with the optical transceiver 30 provides processing capabilities to the OE node.

When an OE node transmits optical signals, the optical signals propagate along one of the optical paths 65 of the optical interconnect mesh 20 towards one of the ports 90 of the bi-directional coupler 80. The optical signals are then directed to the reflecting optical element 70 via the port 100 and the optical path 110. The reflecting optical element 70 reflects the optical signals back to the port 100 via the optical path 110. The bi-directional coupler 80 then distributes such reflected optical signals among all the optical receivers 50 via the ports 90 and corresponding optical paths 65 of the optical interconnect mesh 20. It is thus appreciated that the optical interconnect mesh 20 has a structure which enables transmission by one OE node associated with the optical interconnect mesh 20 to be received by all other OE nodes associated with the optical interconnect mesh 20. Preferably, optical transmission power of each optical transceiver 30 is selected so as to take into account optical power distribution according to a number of ports 90 in the bi-directional coupler 80.

It is appreciated that the bi-directional coupler 80 also distributes the reflected optical signals among the optical transmitters 40 and 60 but the isolators 120 preferably protect the optical transmitters 40 and 60 from such back reflections of light from the reflecting optical element 70.

Since in the network of the PIC device 10 a transmission by one OE node is received by all other OE nodes, the network of the PIC device 10 is capable of operating as a bus/broadcast network or a star network.

In operation as a bus/broadcast network, the optical path 110 may be referred to as a bus to which all the OE nodes transmit optical signals and from which all the OE nodes receive optical signals. Multicast to only some of the OE nodes may be obtained by broadcasting information with addresses of only some of the OE nodes. Although all the OE nodes receive the information, only OE nodes having one of the broadcasted addresses process the information and all other OE nodes ignore the information. Unicast may similarly be obtained by broadcasting information with an address of only one OE node.

In operation as a star network, the processing capabilities of the OE nodes are used and the reflecting optical element 70 may be referred to as a central repeater having no processing capabilities. Multicast to only some of the OE nodes may be obtained by broadcasting information with addresses of only some of the OE nodes. Although all the OE nodes receive the information, only OE nodes having one of the broadcasted addresses process the information and all other OE nodes ignore the information. Unicast may similarly be obtained by broadcasting information with an address of only one OE node.

It is appreciated that the network of the PIC device 10 is also capable of operating as a ring network although such operation is more complicated than operation as a bus/broadcast network or a star network. In operation as a ring network, each OE node in the PIC device 10 may transmit information with an address of only one OE node, and all the other OE nodes are turned-off at a time when the information is transmitted thus disabling broadcast. The OE nodes are cyclically addressed so that a first OE node transmits the information to a second OE node which, in turn, transmits the information to a third OE node, and so on.

When two OE nodes communicate with each other, a receiving OE node checks received information and if the received information is addressed to the receiving OE node, the receiving OE node processes the information. If the received information is not addressed to the receiving OE node, the receiving OE node transmits the received information to another OE node. Each OE node thus operates as a repeater. Multicast may be obtained by associating addresses of a plurality of OE nodes with the information and instructing addressed OE nodes to process information addressed thereto as well as to repeat and handover the information to other OE nodes.

It is appreciated that the network of the PIC device 10 is capable of operating as any one of the star network, the bus/broadcast network and the ring network due to, inter alia, the structure of the optical interconnect mesh 20. The structure of the optical interconnect mesh 20 also enables a configurable network architecture in which the PIC device 10 is enabled to be reconfigured from a first network architecture to a second network architecture. For example, if initially the PIC device 10 is configured in the star network architecture, the PIC device 10 may later be reconfigured, for example in response to an instruction entered by an operator of the control and management system 190, from the star network architecture to the bus/broadcast network architecture or to the ring network architecture. Such reconfiguration is performed, for example, by changing operation modes of the optical transceivers 30 to correspond to the reconfigured network architecture.

It is appreciated that the operation of the PIC device 10 is preferably controlled and managed by the control and management system 190.

It is further appreciated that communication among OE nodes in the network of the PIC device 10 is not dependent upon specific locations of the OE nodes in the PIC device 10. Rather, communication among the OE nodes in the network of the PIC device 10 is enabled even if the OE nodes are spread throughout large portions of the PIC device 10. In a case where electronic chips or subsystems of electronic chips are associated with the OE nodes, the electronic chips or the subsystems of electronic chips may communicate with each other regardless of their actual locations in the PIC device 10. It is appreciated that the electronic chips or the subsystems of electronic chips preferably use conventional network protocols for communication among them.

In a case where the PIC device 10 is comprised in a first linecard, the PIC device 10 may communicate with another PIC device (not shown) in a second linecard via the link adder 140 using conventional network protocols thus enabling linecard-to-linecard communication.

The network of the PIC device 10 also preferably enables flexible assignment of optical transceivers 30 for providing at least one of communication protection and communication restoration. Since, as mentioned above, in the network of the PIC device 10 a transmission by one OE node is received by all other OE nodes, any optical transceiver 30 in an OE node may be assigned for providing communication protection and/or communication restoration for the entire network of the PIC device 10 or for a specific optical transceiver 30 of a specific OE node without affecting the other OE nodes.

If only a single channel wavelength is to be used for communication protection and/or for communication restoration, the single channel wavelength may be assigned for protection and/or for restoration for the entire network of the PIC device 10 or for a specific optical transceiver 30 of a specific OE node without affecting the other OE nodes and also without affecting other channel wavelengths that are used by the optical transceivers 30 in the PIC device 30. It is appreciated that the single channel wavelength or a plurality of channel wavelengths may be selected for providing the communication protection and/or the communication restoration over the single channel wavelength or the plurality of channel wavelengths, respectively. Selection of the single channel wavelength or the plurality of channel wavelengths may be carried out in advance or dynamically based upon availability of the single channel wavelength or the plurality of channel wavelengths.

Preferably, assignment of optical transceivers 30 for providing at least one of communication protection and communication restoration is performed by the control and management system 190, and an indication of the assignment, as well as an indication of which optical transceivers 30 are protected, is flagged throughout the PIC device 10.

By way of example, which is not meant to be limiting, the control and management system 190 may determine a first sub-group of the set of optical transceivers 30 as a sub-group of active optical transceivers for normal communication. In response to a determination of the first sub-group, a second sub-group of the set of optical transceivers 30 is preferably assigned as a protecting sub-group of optical transceivers for providing at least one of communication protection and communication restoration for the first sub-group. Preferably, the control and management system 190 maintains an identification of the first sub-group and an identification of the second sub-group.

It is appreciated that the second sub-group is preferably automatically assigned as the protecting sub-group of optical transceivers. By way of example, which is not meant to be limiting, if the first sub-group includes half the number of optical transceivers in the set of optical transceivers 30, the rest of the optical transceivers in the set of optical transceivers 30 may automatically be assigned as protecting optical transceivers.

Preferably, communication protection and communication restoration may be applied as necessary to achieve recovery in case of a communication failure. The communication failure may, for example, occur due to failures in optical transceivers 30, which failures may result from at least one of the following: an optical fault; a thermal deviation fault; and an electronic fault. The communication failure may apply to one channel wavelength or to a plurality of channel wavelengths.

The recovery may be achieved according to one of well known recovery schemes described in the above-mentioned article entitled "IETF Work on Protection and Restoration for Optical Networks", by David W. Griffith in *Optical Networks Magazine*, July/August 2003, pages 101-106, the disclosure of which is hereby incorporated herein by reference. For example, a 1+1 recovery scheme or a 1:1 recovery scheme may be used in the above-mentioned case where the first sub-group includes half the number of optical transceivers in the set of optical transceivers 30 and the rest of the optical transceivers in the set of optical transceivers 30 are assigned as protecting optical transceivers.

Preferably, each OE node may use one channel wavelength or a plurality of channel wavelengths depending on whether the optical transceiver 30 associated therewith uses one channel wavelength or a plurality of channel wavelengths. The optical interconnect mesh 20 also enables use of one channel wavelength or a plurality of channel wavelengths. Thus, the network of the PIC device 10 is capable of using wavelength division multiplexing (WDM) of two or more wavelengths in configurations employing coarse WDM (CWDM), dense WDM (DWDM), and optical frequency division multiplexing (OFDM).

Preferably, the PIC device 10 uses each of WDM, CWDM, DWDM and OFDM in either a broadcast-and-select configuration or a wavelength routing configuration. In the broadcast-and-select configuration each OE node transmits over a separate channel wavelength or over a separate set of channel wavelengths, and wavelength division multiplexed transmissions from all the OE nodes are received by all the OE nodes but each OE node processes only a transmission provided over a channel wavelength assigned thereto or transmissions provided over a set of channel wavelengths assigned thereto. It is appreciated that assignment of a specific channel wavelength or a specific set of channel wavelengths to an OE node may be performed, for example, by instructing the optical receiver 50 of the OE node to tune to the specific channel wavelength or to the specific set of channel wavelengths, respectively.

It is thus appreciated that when WDM or any of its variants is used in the PIC device 10, more than one OE node may transmit at a time provided that each transmitting OE node uses a separate channel wavelength or a separate set of channel wavelengths.

In the wavelength routing configuration a lightpath between a transmitting OE node and a receiving OE node is determined by a channel wavelength and addresses of the transmitting OE node and the receiving OE node. A transmission by the transmitting OE node is preferably associated with the address of the receiving OE node. Although the transmission is received by all the OE nodes in the network of the PIC device 10, only the receiving OE node addressed by the transmitting OE node may process the transmission transmitted by the transmitting OE node and use it or forward it as necessary.

It is appreciated that the PIC device 10 may be comprised in a photonic switch (not shown) and used to switch and route optical signals. For example, a first OE node in the PIC device 10 may receive an optical packet either from a first element of the photonic switch (not shown) or from a chip in the PIC device 10 which is associated with the first OE node and switch the optical packet either to a second OE node of the PIC device 10 or to a second element of the photonic switch. In such an application, the photonic switch replaces the external optical unit 150 and reception of the optical packet from the first element of the photonic switch and transmission of the optical packet to the second element of the photonic switch are preferably performed via the link adder 140. The optical packet may include a fixed-length optical packet, or an optical burst, that is a variable-length optical packet.

In a case where at least some OE nodes in the PIC device 10 comprise multi-channel laser array modules, some of the multi-channel laser array modules may use separate sets of wavelengths. For example, a first multi-channel laser array module may be capable of simultaneously transmitting over a first set of channel wavelengths, and a second multi-channel laser array module may be capable of simultaneously transmitting over a second set of channel wavelengths, where the channel wavelengths of the second set are different from the channel wavelengths of the first set. In such a case, the first multi-channel laser array module and the second multi-channel laser array module may simultaneously transmit via the optical interconnect mesh 20, and a single optical receiver 50 may simultaneously receive transmissions provided by the first multi-channel laser array module over the first set of channel wavelengths and transmissions provided by the second multi-channel laser array module over the second set of channel wavelengths.

The first and second multi-channel laser array modules may be used for normal communication with the single optical receiver 50. Alternatively, the second multi-channel laser array module or a portion thereof may be used for providing at least one of communication protection and communication restoration for the first multi-channel laser array module. For example, the first multi-channel laser array module may transmit simultaneously over channel wavelengths $\lambda_1, \lambda_2, \lambda_3$ and $\lambda_4$ and the second multi-channel laser array module may transmit simultaneously over channel wavelengths $\lambda_5, \lambda_6, \lambda_7$ and $\lambda_8$. The channel wavelengths $\lambda_1$-$\lambda_7$ may be used for normal communication and $\lambda_8$ may be used for any one of the following: protection of communication over $\lambda_1$ only; protection of communication over any of $\lambda_1$-$\lambda_4$; and protection of communication over any of $\lambda_1$-$\lambda_7$.

Alternatively, more than one channel wavelength may be used for communication protection. For example, $\lambda_4$ may be used for protection of communication over any of $\lambda_5$-$\lambda_7$ and $\lambda_8$ may be used for protection of communication over any of $\lambda_1$-$\lambda_3$. It is appreciated that in general it is preferred, but not mandatory, to protect a channel wavelength used by one multi-channel laser array module by a channel wavelength used by another multi-channel laser array module.

The network of the PIC device 10 also preferably enables verification of optical functionality of the optical transmitters 40 and 60 in the PIC device 10. Preferably, each of the optical transmitters 40 and 60 is assigned an individual optical signal for optical functionality verification. An optical transmitter 40 or 60, whose optical functionality is to be verified, preferably transmits via the optical interconnect mesh 20 its individually assigned optical signal and at least one of the plurality of optical receivers 50 which receives the individually assigned optical signal preferably determines whether the individually assigned optical signal is correctly received. A determination that the individually assigned optical signal is correctly received may preferably be used to verify both optical functionality of the optical transmitter 40 or 60 which transmits the individually assigned optical signal and optical functionality of the at least one of the plurality of optical receivers 50 which receives the individually assigned optical signal.

The individually assigned optical signals are preferably different from each other. Alternatively, at least some of the individually assigned optical signals may have identical patterns but be carried over separate channel wavelengths. In such a case, the at least one of the plurality of optical receivers 50 which receives the individually assigned optical signal also preferably determines whether the individually assigned optical signal is received over a correct channel wavelength. The individually assigned optical signals may be fixed or alterable by an operator of the control and management system 190. Preferably, each of the individually assigned optical signals includes a digitally coded optical signal.

Preferably, the OE nodes in the PIC device 10 may be configured for operation with at least one of the following: various optical switching methods; optical signals of various types and formats; and optical signals coded in various line codes. For example, which is not meant to be limiting, the OE nodes in the PIC device 10 may be configured for operation with circuit switching or optical packet switching, streamed optical signals or optical packets, and return-to-zero (RZ) or non-return-to zero (NRZ) coded optical signals. It is appreciated that such configurations of the OE nodes in the PIC device 10 may, for example, be performed during installation of the PIC device 10 and changed dynamically, for example, by the operator of the control and management system 190.

In a case where the OE nodes of the PIC device 10 operate with optical packets, an OE node in the PIC device 10 may determine, from a plurality of optical packets, a first group of optical packets that can be switched by a flow-switching technique (FST) and a second group of optical packets that cannot be switched by FST. FST is described, for example, in the above-mentioned article entitled "Packet switching takes steps toward optical", by Jeff Hecht in *Laser Focus World*, June 2002, pages 131-139, the disclosure of which is hereby incorporated herein by reference.

Preferably, the OE node may switch the first group of optical packets by using FST and the second group of optical packets by using packet switching. It is appreciated that the first group of optical packets may include at least one of the following: at least one optical burst that exceeds a packet-length threshold; and at least one optical packet that is combinable with other optical packets. The packet-length threshold may preferably be pre-selected.

It is appreciated that in the present invention the embedded optical interconnect mesh 20 is used to enable a network architecture that allows communication among various combinations of optical transceivers 30 in the PIC device 10 and particularly allows any optical transmitter 40 or 60 to communicate with any optical receiver 50 via the optical interconnect mesh 20.

In accordance with a preferred embodiment of the present invention the PIC device 10, and particularly the optical transmitters 40 and 60, include elements that aid in operation in an environment in which a plurality of optical transceivers operate simultaneously, for example, to perform a plurality of tasks and/or to communicate various data items. It is appreciated that such elements are also appropriate for and usable with PIC devices that employ separate optical interconnects and optical communication systems that employ a plurality of optical transmitters and optical receivers.

The elements that aid in operation in an environment in which a plurality of optical transceivers operate simultaneously are preferably comprised in or associated with tunable laser modules and multi-channel laser array modules that are comprised in the optical transmitters 40 and 60. The elements that aid in operation in an environment in which a plurality of optical transceivers operate simultaneously, as well as features enabled by such elements, are described herein below with reference to FIGS. 2 and 3.

Tunable laser modules have been subject to intensive standardization efforts which resulted in a series of tunable laser standards known as Implementation Agreements OIF-TL-01.1, OIF-TLMSA-01.1, and OIF-ITLA-MSA-01.1, the disclosures of which are hereby incorporated herein by reference. However, tunable laser modules that operate in an environment in which a plurality of optical transceivers operate simultaneously may require additional elements and features that are not provided by the above-mentioned tunable laser standards.

Figure 2:
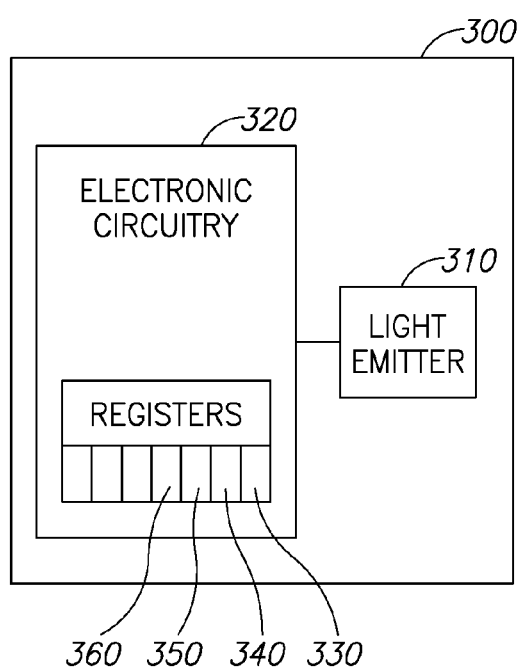
FIG. 2 is a simplified block diagram illustration of a preferred implementation of a tunable laser module constructed and operative in accordance with a preferred embodiment of the present invention.

Reference is now additionally made to FIG. 2, which is a simplified block diagram illustration of a preferred implementation of a tunable laser module 300 constructed and operative in accordance with a preferred embodiment of the present invention.

The tunable laser module 300 preferably includes a light emitter 310 and electronic circuitry 320. For simplicity, additional elements of the tunable laser module 300 which are well known in the art, such as interfaces and a heat sink, are not shown in FIG. 2.

The light emitter 310 is preferably capable of selectively transmitting in any one of a plurality of channel wavelengths within at least one wavelength band.

In accordance with a preferred embodiment of the present invention the electronic circuitry 320 includes at least one of the following registers or a combination thereof: a register 330; a register 340; a register 350; and a register 360. Each of the registers 330, 340, 350 and 360 may be implemented by any appropriate register, such as a register assigned as a register for user data storage (User1 register) in accordance with the above-mentioned tunable laser standards, or a register assigned as a manufacturer specific register in accordance with the above-mentioned tunable laser standards, or any other appropriate unassigned and/or available register. Each of the registers 330, 340, 350 and 360 may alternatively be implemented by a plurality of appropriate registers. It is appreciated that the registers 330, 340, 350 and 360 may be implemented by registers which provide various storage areas.

The register 330 preferably stores an indication that the tunable laser module 300 is assigned to provide at least one of communication protection and communication restoration. The at least one of communication protection and communication restoration is preferably provided for at least one of the following: at least a portion of a separate optical transmitter; and at least a portion of an optical communication system. The separate optical transmitter preferably includes any appropriate optical transmitter comprising, for example, at least one of the following: a VCSEL; a LED; an EEL; a tunable laser; a fixed-channel laser; and a tunable VCSEL.

The indication preferably includes an identification of at least one of the following: the at least a portion of the separate optical transmitter; and the at least a portion of the optical communication system. Thus, for example, in a case where the tunable laser module 300 is comprised in a first optical transmitter 40 in the PIC device 10, the register 330 may store an indication indicating that the first optical transmitter 40, or a portion thereof, is assigned to provide at least one of communication protection and communication restoration for a second optical transmitter 40 in the PIC device 10 or for the entire network of the PIC device 10, and an identification of the second optical transmitter 40 or the network of the PIC device 10, respectively.

Preferably, the register 330 also stores an identification of at least one channel wavelength over which the at least one of communication protection and communication restoration is provided.

It is appreciated that such an indication, as well as the identification of which portion of the optical transmitter or portion of the optical communication system is to be protected and the at least one channel wavelength over which the at least one of communication protection and communication restoration is provided, is useful in cases where due to a large number of optical transceivers in an environment in which a plurality of optical transceivers operate simultaneously it is difficult for an operator to determine which optical transmitters are assigned to provide protection and/or restoration, which transceivers are protected, which channel wavelengths are used for protection and/or restoration, and whether changes in assignments of optical transmitters and assignments of channel wavelengths for communication are allowed.

In such cases, the operator may, for example, transmit a query to the tunable laser module 300 and receive a response with an indication as stored in the register 330, which indication may, for example, indicate that the tunable laser module 300 is assigned to provide communication protection for a specific optical transmitter 40, an identification of the specific optical transmitter 40, and an identification of, for example, a channel wavelength $\lambda_1$ over which communication protection and communication restoration are provided. The operator may then mark a first optical transceiver 30 in which the specific optical transmitter 40 is comprised as a protected optical transceiver, a second optical transceiver 30 in which the tunable laser module 300 is comprised as a protecting optical transceiver, and $\lambda_1$ as a channel wavelength over which protection and restoration are provided. Such marking may then, for example, be used to avoid using the protecting optical transceiver, the protected optical transceiver, and $\lambda_1$ for other purposes.

It is appreciated that transmission of such a query and use of the response for such marking may also be performed in PIC devices that employ separate optical interconnects and in optical communication systems that employ a plurality of optical transmitters and optical receivers.

The register 340 preferably stores an indication identifying a location within a PIC device in which a circuit structure which is at least partially embedded in the PIC device is located, where the circuit structure comprises at least a portion of the tunable laser module 300. The indication identifying the location within the PIC device preferably includes at least one of the following: an indication of a layer of the PIC device in which the circuit structure is comprised; and an indication of an area of the PIC device in which the circuit structure is located. It is appreciated that such an indication is useful in the PIC device 10 as well as in PIC devices that employ separate optical interconnects, for example, for determining a location of the tunable laser module 300 in cases where a plurality of optical transceivers are distributed in various PIC areas and/or PIC layers.

The register 350 preferably stores an identification of at least one channel wavelength of the plurality of channel wavelengths which is unusable by the tunable laser module 300. The at least one unusable channel wavelength may, for example, be unusable due to at least one of the following: a warning fault; a fatal fault; a constraint of a system in which the tunable laser module 300 is comprised; and an instruction of an operator. Each of the warning fault and the fatal fault preferably includes at least one of the following: an optical fault; a thermal deviation fault; and an electronic fault. The at least one unusable channel wavelength may include at least one channel wavelength which is temporarily unusable.

It is appreciated that such an identification of unusable channel wavelengths is useful for avoiding unsuccessful attempts to use unusable channel wavelengths in the PIC device 10 as well as in PIC devices that employ separate optical interconnects and in optical communication systems that employ a plurality of optical transmitters and optical receivers.

The register 360 preferably stores at least one bit enabling return from a current channel grid configuration to at least one of the following: a previous channel grid configuration; and a default channel grid configuration. The default channel grid configuration may preferably be preset or user-selected. Presetting of the default channel grid configuration may occur once, for example during installation of the tunable laser module 300, or more than once, for example each time a change occurs in conditions at the tunable laser module 300, such as a change in temperature conditions. It is appreciated that return to the previous channel grid configuration or to the default channel grid configuration is preferably performed in response to a return-to-grid (RTG) instruction.

Enabling return from a current channel grid configuration to a previous channel grid configuration or to a default channel grid configuration is useful, for example, in cases where the current channel grid configuration includes unusable channel wavelengths whereas the previous channel grid configuration and the default channel grid configuration do not include unusable channel wavelengths. In such cases, the operator may attempt to change the current channel grid but if such an attempt results in another channel grid which includes unusable channel wavelengths, the operator may prefer to return to the previous channel grid configuration or to the default channel grid configuration by using the at least one bit enabling return from a current channel grid configuration.

It is appreciated that the at least one bit enabling return from a current channel grid configuration is useful in the PIC device 10 as well as in PIC devices that employ separate optical interconnects and in optical communication systems that employ a plurality of optical transmitters and optical receivers.

Figure 3:
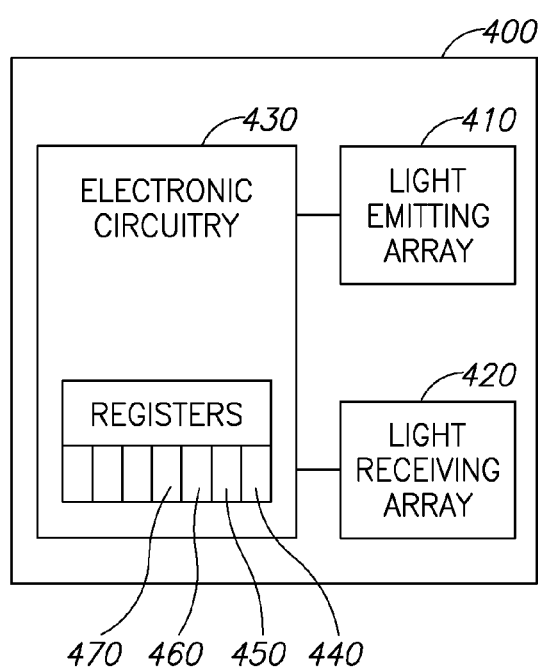
FIG. 3 is a simplified block diagram illustration of a preferred implementation of a multi-channel laser array module constructed and operative in accordance with a preferred embodiment of the present invention.

Reference is now additionally made to FIG. 3, which is a simplified block diagram illustration of a preferred implementation of a multi-channel laser array module 400 constructed and operative in accordance with a preferred embodiment of the present invention.

The multi-channel laser array module 400 preferably includes a light emitting array 410, a light receiving array 420, and electronic circuitry 430. For simplicity, additional elements of the multi-channel laser array module 400 which are well known in the art, such as interfaces and heat sinks, are not shown in FIG. 3.

The light emitting array 410 is preferably capable of simultaneously transmitting in a plurality of channel wavelengths within at least one wavelength band. The light emitting array 410 preferably includes at least one of the following: a VCSEL array; a tunable VCSEL array; an EEL array; an assembly combining a plurality of fixed-channel lasers; and an assembly combining a plurality of tunable single-channel lasers.

The light receiving array 420 is preferably capable of simultaneously receiving in a plurality of channel wavelengths within at least one wavelength band. The light receiving array 420 preferably includes at least one of the following: a PD array; and a photo-detector array. Each PD in the PD array preferably includes at least one of the following: a p-i-n photodiode; and an APD. Each photo-detector in the photo-detector array preferably includes an MSM photo-detector.

In accordance with a preferred embodiment of the present invention the electronic circuitry 430 includes at least one of the following registers or a combination thereof: a register 440; a register 450; a register 460; and a register 470. Each of the registers 440, 450, 460 and 470 may be implemented by any appropriate register or by a plurality of appropriate registers. It is appreciated that the registers 440, 450, 460 and 470 may be implemented by registers which provide various storage areas.

The register 440 preferably stores an identification of at least one channel wavelength of the plurality of channel wavelengths which is unusable by the multi-channel laser array module 400. The at least one unusable channel wavelength may, for example, be unusable due to at least one of the following: a warning fault; a fatal fault; a constraint of a system in which the multi-channel laser array module 400 is comprised; and an instruction of an operator. Each of the warning fault and the fatal fault preferably includes at least one of the following: an optical fault; a thermal deviation fault; and an electronic fault. The at least one unusable channel wavelength may include at least one channel wavelength which is temporarily unusable.

It is appreciated that such an identification of unusable channel wavelengths is useful for avoiding unsuccessful attempts to use unusable channel wavelengths in the PIC device 10 as well as in PIC devices that employ separate optical interconnects and in optical communication systems that employ a plurality of optical transmitters and optical receivers.

The register 450 preferably stores an indication identifying a location within a PIC device in which a circuit structure which is at least partially embedded in the PIC device is located, where the circuit structure comprises at least a portion of the multi-channel laser array module 400. The indication identifying the location within the PIC device preferably includes at least one of the following: an indication of a layer of the PIC device in which the circuit structure is comprised; and an indication of an area of the PIC device in which the circuit structure is located. It is appreciated that such an indication is useful in the PIC device 10 as well as in PIC devices that employ separate optical interconnects, for example, for determining a location of the multi-channel laser array module 400 in cases where a plurality of optical transceivers are distributed in various PIC areas and/or PIC layers.

The register 460 preferably stores an indication that at least one single-channel laser in the multi-channel laser array module 400 is assigned to provide at least one of communication protection and communication restoration. The at least one of communication protection and communication restoration is preferably provided for at least one of the following: at least a portion of a separate optical transmitter; at least a portion of an optical communication system; and a portion of the multi-channel laser array module 400 that does not include the at least one single-channel laser. The separate optical transmitter preferably includes any appropriate optical transmitter comprising, for example, at least one of the following: a VCSEL; a LED; an EEL; a tunable laser; a fixed-channel laser; and a tunable VCSEL.

The indication preferably includes an identification of at least one of the following: the at least a portion of the separate optical transmitter; the at least a portion of the optical communication system; the at least one single-channel laser; and the portion of the multi-channel laser array module 400 that does not include the at least one single-channel laser.

In a case where the multi-channel laser array module 400 includes a tunable multi-channel laser array module, the register 460 may also preferably store an identification of at least one channel wavelength over which the at least one of communication protection and communication restoration is provided.

It is appreciated that such an indication is, for example, useful in cases where due to a large number of multi-channel optical transceivers in an environment in which a plurality of optical transceivers operate simultaneously it is difficult for an operator to determine which portions of optical transmitters are assigned to provide protection and/or restoration, which portions of optical transmitters are protected and which optical transceivers are protected, which channel wavelengths are used for protection and/or restoration, and whether changes in assignments of optical transmitters and assignments of channel wavelengths for communication are allowed.

In such cases, the operator may, for example, transmit a query to the multi-channel laser array module 400 and receive a response with an indication as stored in the register 460, which indication may, for example, indicate that a single-channel laser in the multi-channel laser array module 400 that operates at a wavelength $\lambda_1$ is assigned to provide communication protection for another single-channel laser in the multi-channel laser array module 400 that operates at a wavelength $\lambda_2$ and for a specific optical transmitter 40. The operator may then mark the specific optical transmitter 40 and the laser operating at $\lambda_2$ as protected, and the laser operating at $\lambda_1$ as a protecting laser. Such marking may then, for example, be used to avoid using the laser operating at $\lambda_1$ for a different task.

It is appreciated that transmission of such a query and use of the response for such marking may also be performed in PIC devices that employ separate optical interconnects and in optical communication systems that employ a plurality of optical transmitters and optical receivers.

The register 470 is particularly useful in a case where the multi-channel laser array module 400 includes a tunable multi-channel laser array module. In such a case, the register 470 is preferably used as the register 360 of FIG. 2 to store at least one bit enabling return from a current channel grid configuration to at least one of the following: a previous channel grid configuration; and a default channel grid configuration. The default channel grid configuration may preferably be preset or user-selected. Presetting of the default channel grid configuration may occur once, for example during installation of the multi-channel laser array module 400, or more than once, for example each time a change occurs in conditions at the multi-channel laser array module 400, such as a change in temperature conditions. It is appreciated that return to the previous channel grid configuration or to the default channel grid configuration is preferably performed in response to a return-to-grid (RTG) instruction.

Enabling return from a current channel grid configuration to a previous channel grid configuration or to a default channel grid configuration is useful, for example, in cases where the current channel grid configuration includes unusable channel wavelengths whereas the previous channel grid configuration and the default channel grid configuration do not include unusable channel wavelengths. In such cases, the operator may attempt to change the current channel grid but if such an attempt results in another channel grid which includes unusable channel wavelengths, the operator may prefer to return to the previous channel grid configuration or to the default channel grid configuration by using the at least one bit enabling return from a current channel grid configuration.

It is appreciated that the at least one bit enabling return from a current channel grid configuration is useful in the PIC device 10 as well as in PIC devices that employ separate optical interconnects and in optical communication systems that employ a plurality of optical transmitters and optical receivers.

Figure 4:
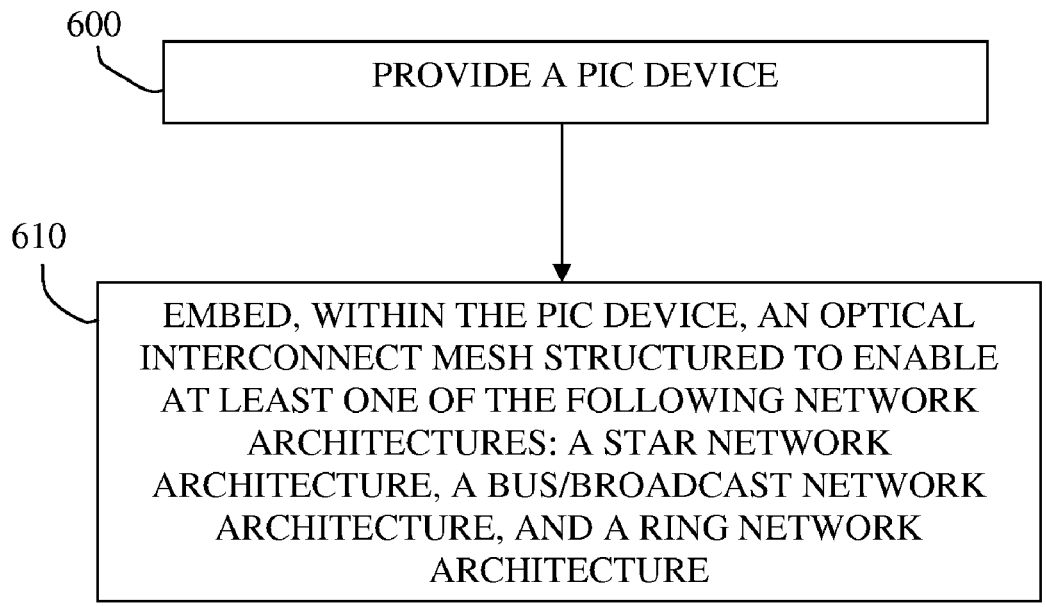
FIG. 4 is a simplified flowchart illustration of a preferred method of operation of the PIC device of FIG. 1.

Reference is now made to FIG. 4, which is a simplified flowchart illustration of a preferred method of operation of the PIC device 10 of FIG. 1.

A PIC device is preferably provided (step 600). Preferably, an optical interconnect mesh is embedded (step 610) within the PIC device, where the optical interconnect mesh is structured to enable at least one of the following network architectures: a star network architecture; a bus/broadcast network architecture; and a ring network architecture.

Figure 5:
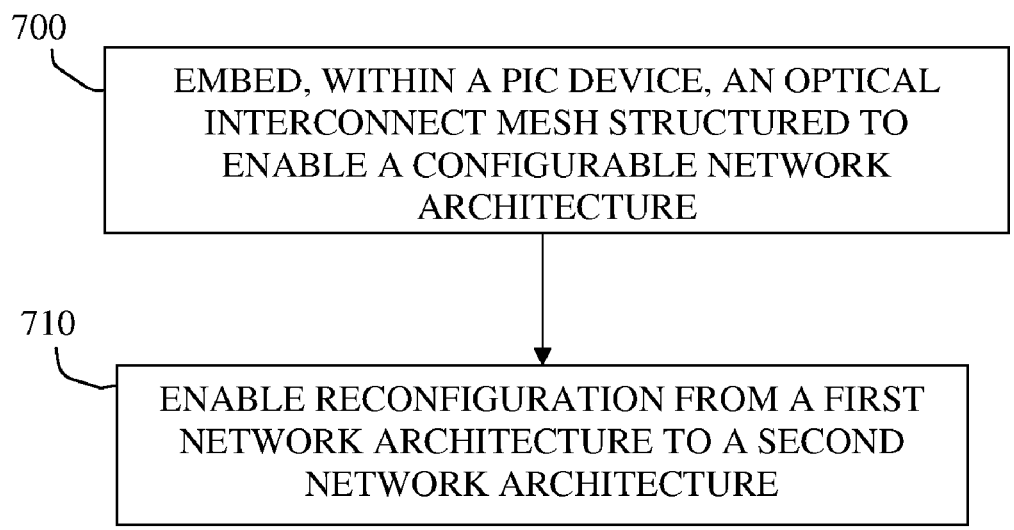
FIG. 5 is a simplified flowchart illustration of another preferred method of operation of the PIC device of FIG. 1.

Reference is now made to FIG. 5, which is a simplified flowchart illustration of another preferred method of operation of the PIC device 10 of FIG. 1.

Preferably, an optical interconnect mesh is embedded (step 700) within a PIC device, where the optical interconnect mesh is structured to enable a configurable network architecture. Then, reconfiguration from a first network architecture to a second network architecture is enabled (step 710). Each of the first network architecture and the second network architecture preferably includes one of the following network architectures: a star network architecture; a bus/broadcast network architecture; and a ring network architecture.

Figure 6:
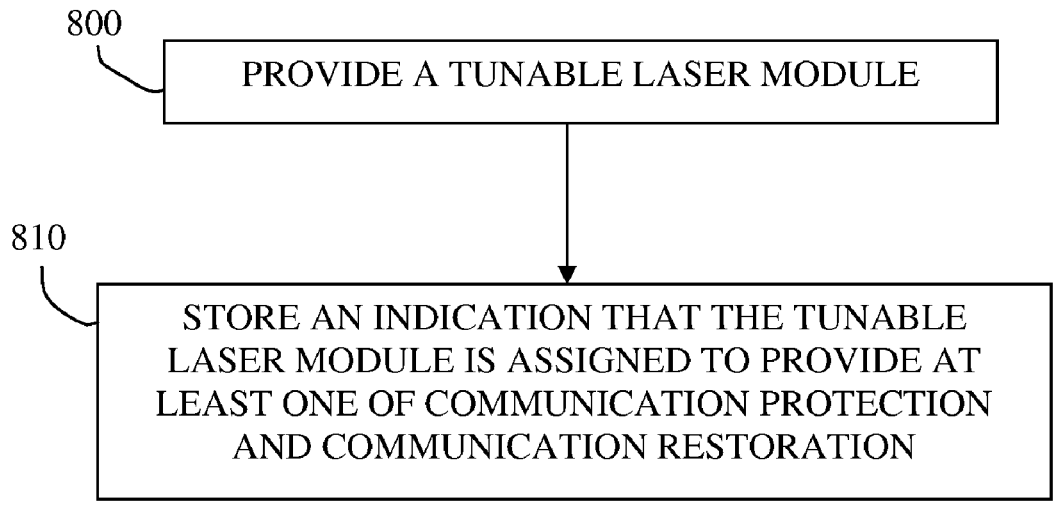
FIG. 6 is a simplified flowchart illustration of a preferred method of operation of the tunable laser module of FIG. 2.

Reference is now made to FIG. 6, which is a simplified flowchart illustration of a preferred method of operation of the tunable laser module 300 of FIG. 2.

A tunable laser module is preferably provided (step 800). Preferably, an indication that the tunable laser module is assigned to provide at least one of communication protection and communication restoration is stored (step 810) and the at least one of communication protection and communication restoration is preferably enabled and provided for at least one of the following: at least a portion of a separate optical transmitter; and at least a portion of an optical communication system. The indication is preferably stored in at least one of the following: a register of the tunable laser module; a register of the separate optical transmitter; and a control and management system of the optical communication system.

The indication preferably includes an identification of at least one of the following: the at least a portion of the separate optical transmitter; and the at least a portion of the optical communication system. Additionally, an identification of at least one channel wavelength over which the at least one of communication protection and communication restoration is provided may also be stored together with the indication.

Preferably, each of the tunable laser module and the separate optical transmitter may be comprised in any one of the following: the PIC device 10 of FIG. 1; a PIC device that employs separate optical interconnects; and an optical communication system that employs a plurality of optical transmitters and optical receivers.

Figure 7:
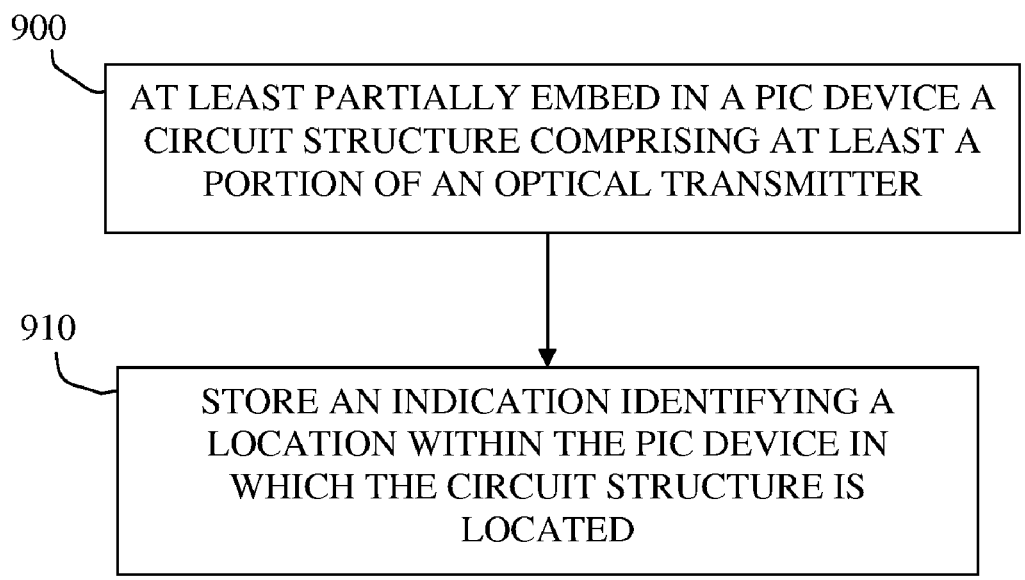
FIG. 7 is a simplified flowchart illustration of a preferred method of operation of any of the tunable laser module of FIG. 2 and the multi-channel laser array module of FIG. 3.

Reference is now made to FIG. 7, which is a simplified flowchart illustration of a preferred method of operation of any of the tunable laser module 300 of FIG. 2 and the multi-channel laser array module 400 of FIG. 3.

Preferably, a circuit structure comprising at least a portion of an optical transmitter is at least partially embedded in a PIC device (step 900). The optical transmitter preferably includes at least one of the following: a tunable laser module; and a multi-channel laser array module. Preferably, an indication identifying a location within the PIC device in which the circuit structure is located is stored (step 910).

Figure 8:
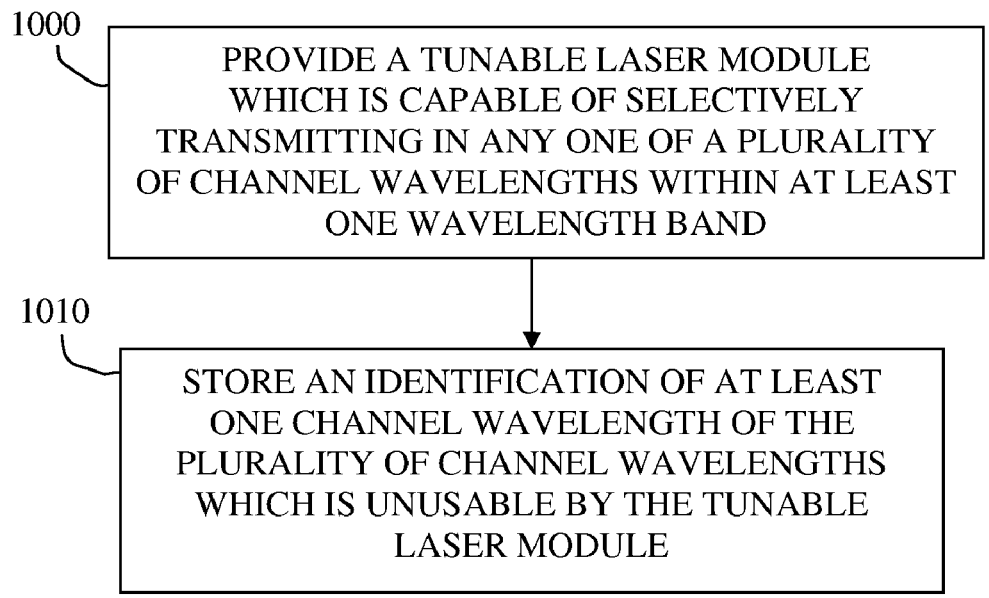
FIG. 8 is a simplified flowchart illustration of another preferred method of operation of the tunable laser module of FIG. 2.

Reference is now made to FIG. 8, which is a simplified flowchart illustration of another preferred method of operation of the tunable laser module 300 of FIG. 2.

Preferably, a tunable laser module which is capable of selectively transmitting in any one of a plurality of channel wavelengths within at least one wavelength band is provided (step 1000). Then, an identification of at least one channel wavelength of the plurality of channel wavelengths which is unusable by the tunable laser module is preferably stored (step 1010).

Figure 9:
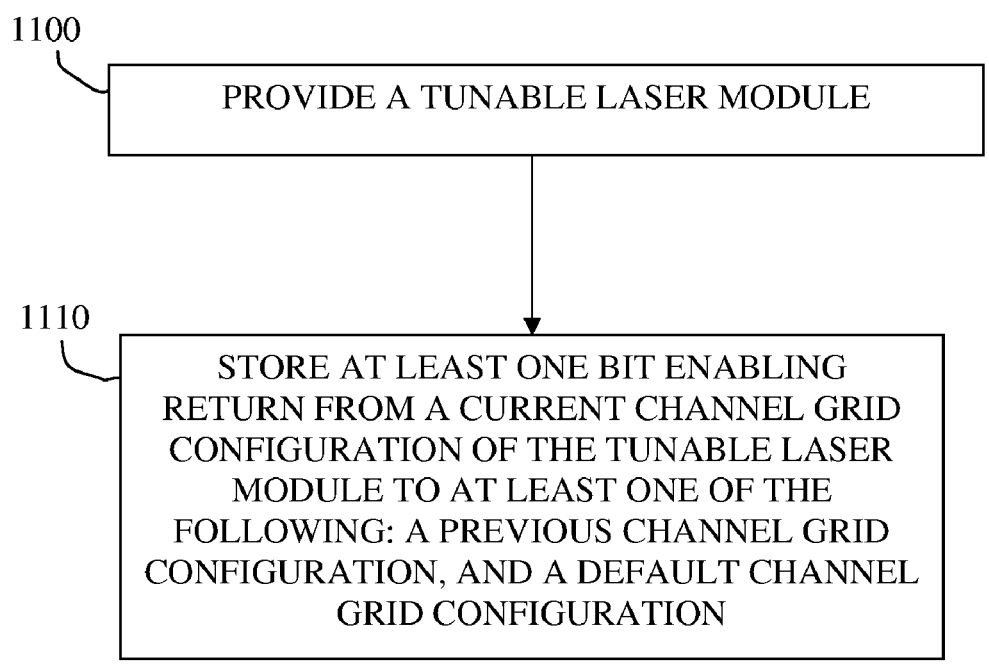
FIG. 9 is a simplified flowchart illustration of yet another preferred method of operation of the tunable laser module of FIG. 2.

Reference is now made to FIG. 9, which is a simplified flowchart illustration of yet another preferred method of operation of the tunable laser module 300 of FIG. 2.

Preferably, a tunable laser module is provided (step 1100). At least one bit which enables return to a state is preferably stored (step 1110). The state preferably includes a channel grid configuration state of the tunable laser module, and the at least one bit preferably enables return from a current channel grid configuration to at least one of the following: a previous channel grid configuration; and a default channel grid configuration. It is appreciated that the tunable laser module may include a tunable multi-channel laser array module in which case the method of FIG. 9 is also applicable to each tunable single-channel laser in the tunable multi-channel laser array module as well as to the entire tunable multi-channel laser array module.

Figure 10:
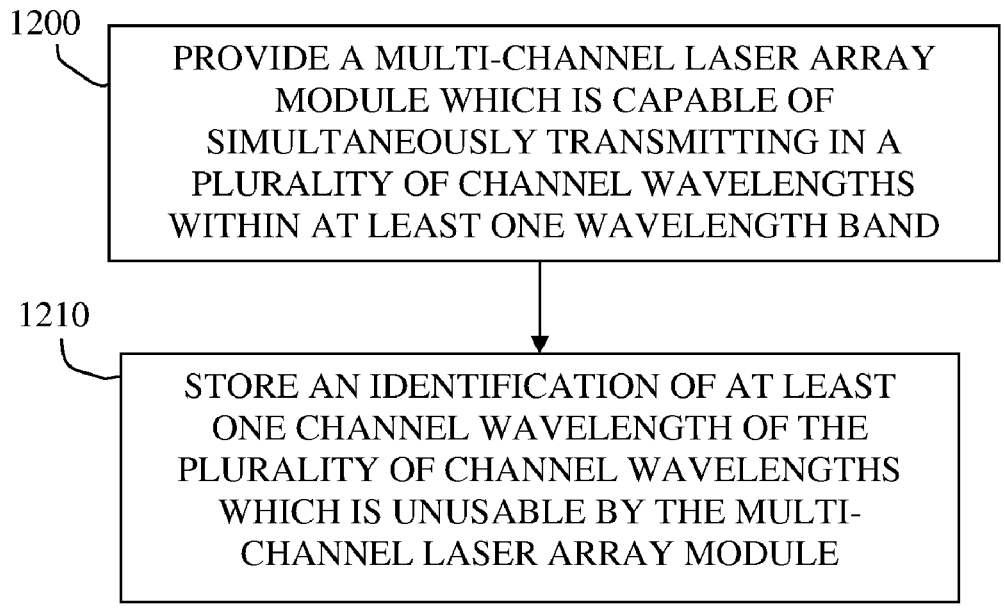
FIG. 10 is a simplified flowchart illustration of a preferred method of operation of the multi-channel laser array module of FIG. 3.

Reference is now made to FIG. 10, which is a simplified flowchart illustration of a preferred method of operation of the multi-channel laser array module 400 of FIG. 3.

Preferably, a multi-channel laser array module which is capable of simultaneously transmitting in a plurality of channel wavelengths within at least one wavelength band is provided (step 1200). Then, an identification of at least one channel wavelength of the plurality of channel wavelengths which is unusable by the multi-channel laser array module is preferably stored (step 1210).

Figure 11:
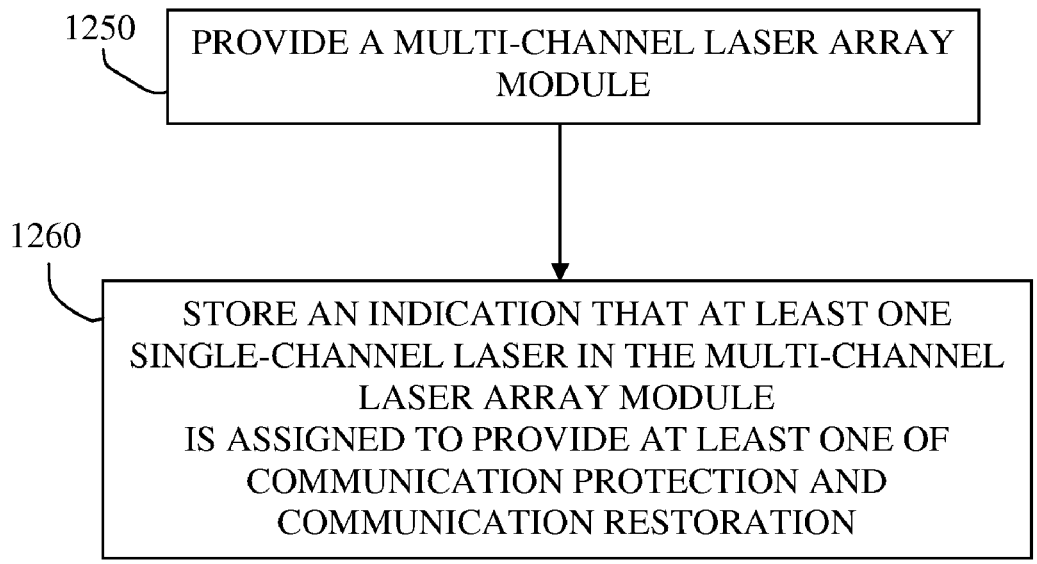
FIG. 11 is a simplified flowchart illustration of another preferred method of operation of the multi-channel laser array module of FIG. 3.

Reference is now made to FIG. 11, which is a simplified flowchart illustration of another preferred method of operation of the multi-channel laser array module 400 of FIG. 3.

A multi-channel laser array module is preferably provided (step 1250). Preferably, an indication that at least one single-channel laser in the multi-channel laser array module is assigned to provide at least one of communication protection and communication restoration is stored (step 1260). It is appreciated that the at least one of communication protection and communication restoration may be provided for at least one of the following: at least a portion of a separate optical transmitter; at least a portion of an optical communication system; and a portion of the multi-channel laser array module that does not include the at least one single-channel laser.

Figure 12:
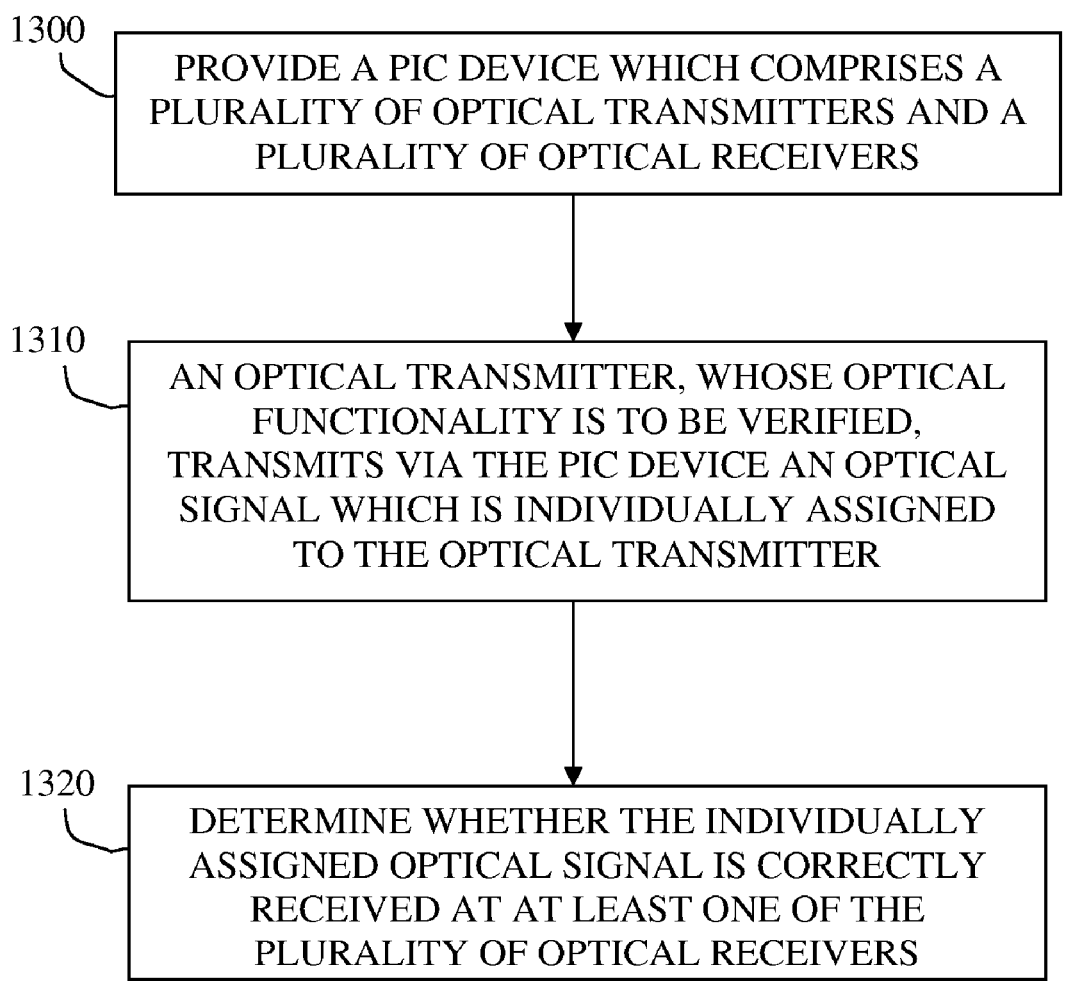
FIG. 12 is a simplified flowchart illustration of a preferred method of verifying optical functionality of an optical transmitter in the PIC device of FIG. 1.

Reference is now made to FIG. 12, which is a simplified flowchart illustration of a preferred method of verifying optical functionality of an optical transmitter in the PIC device 10 of FIG. 1.

A PIC device which comprises a plurality of optical transmitters and a plurality of optical receivers is preferably provided (step 1300). An optical transmitter, whose optical functionality is to be verified, preferably transmits (step 1310) via the PIC device an optical signal which is individually assigned to the optical transmitter. Then, a determination is made (step 1320) of whether the individually assigned optical signal is correctly received at at least one of the plurality of optical receivers.

Figure 13:
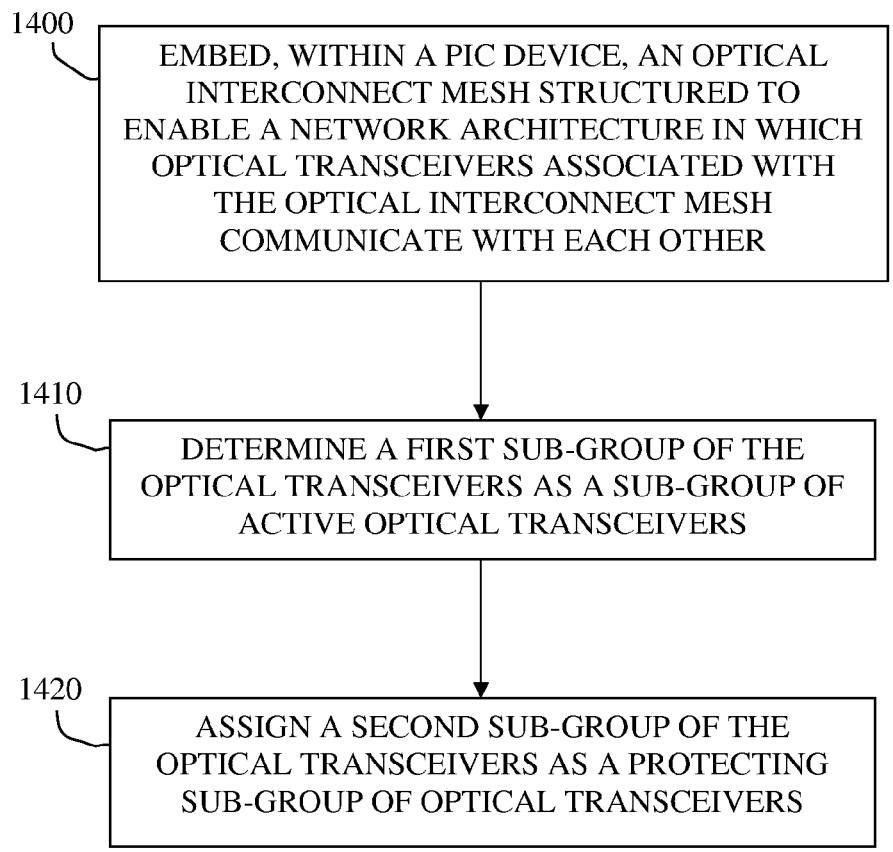
FIG. 13 is a simplified flowchart illustration of a preferred method for providing at least one of communication protection and communication restoration in the PIC device of FIG. 1.

Reference is now made to FIG. 13, which is a simplified flowchart illustration of a preferred method for providing at least one of communication protection and communication restoration in the PIC device 10 of FIG. 1.

Preferably, an optical interconnect mesh is embedded within a PIC device (step 1400). The optical interconnect mesh is preferably structured to enable a network architecture in which optical transceivers associated with the optical interconnect mesh communicate with each other. A first sub-group of the optical transceivers is preferably determined (step 1410) as a sub-group of active optical transceivers for use in normal communication. In response to a determination of the first sub-group, a second sub-group of the optical transceivers is preferably assigned (step 1420), for example automatically, as a protecting sub-group of optical transceivers for providing at least one of communication protection and communication restoration for the first sub-group of the optical transceivers. It is appreciated that an identification of the first sub-group and an identification of the second sub-group may preferably be provided to a control and management system and maintained in the control and management system.

Figure 14:
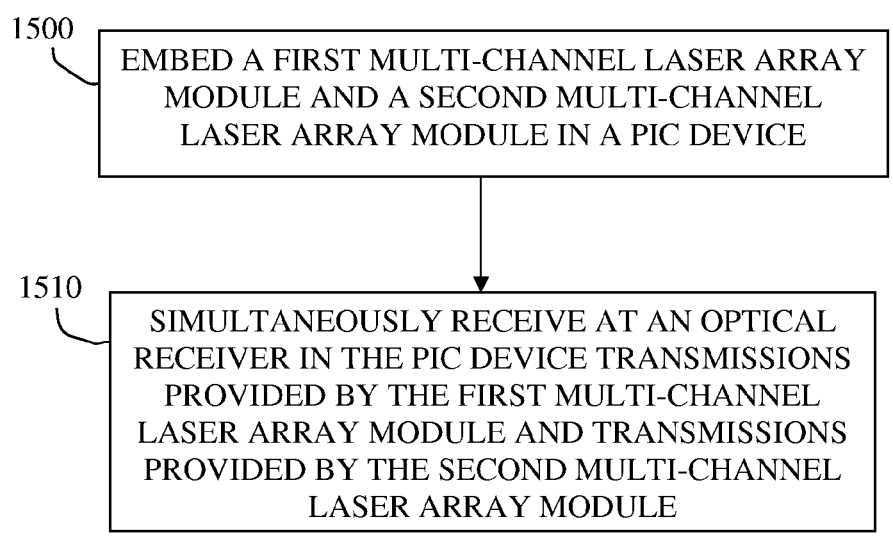
FIG. 14 is a simplified flowchart illustration of a preferred optical receiving method useful with the PIC device of FIG. 1.

Reference is now made to FIG. 14, which is a simplified flowchart illustration of a preferred optical receiving method useful with the PIC device 10 of FIG. 1.

Preferably, a first multi-channel laser array module and a second multi-channel laser array module are embedded in a PIC device (step 1500). The first multi-channel laser array module is preferably capable of simultaneously transmitting over a first set of channel wavelengths, and the second multi-channel laser array module is preferably capable of simultaneously transmitting over a second set of channel wavelengths, where the channel wavelengths of the second set are different from the channel wavelengths of the first set.

Preferably, transmissions provided by the first multi-channel laser array module over the first set of channel wavelengths and transmissions provided by the second multi-channel laser array module over the second set of channel wavelengths are simultaneously received (step 1510) at an optical receiver in the PIC device via an optical interconnect mesh in the PIC device which interconnects the optical receiver to the first multi-channel laser array module and to the second multi-channel laser array module.

Figure 15:
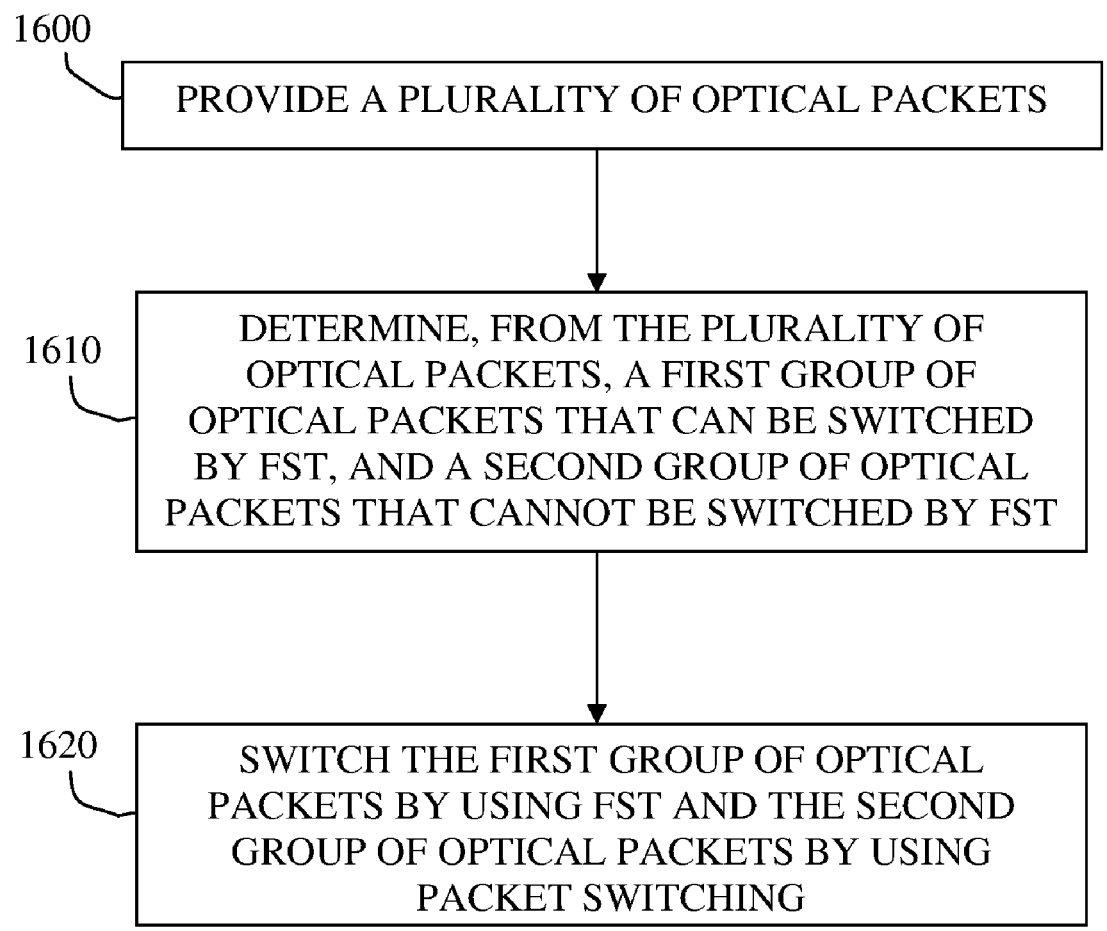
FIG. 15 is a simplified flowchart illustration of a preferred optical switching method useful with the PIC device of FIG. 1.

Reference is now made to FIG. 15, which is a simplified flowchart illustration of a preferred optical switching method useful with the PIC device 10 of FIG. 1.

A plurality of optical packets is preferably provided (step 1600). Preferably, a first group of optical packets that can be switched by a flow-switching technique (FST) and a second group of optical packets that cannot be switched by FST are determined (step 1610) from the plurality of optical packets. Then, the first group of optical packets is switched by using FST and the second group of optical packets is switched by using packet switching (step 1620). The first group of optical packets preferably includes at least one of the following: at least one optical burst that exceeds a packet-length threshold; and at least one optical packet that is combinable with other optical packets. The packet-length threshold may preferably be preset.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the claims that follow:

What is claimed is:

1. A method for verifying optical functionality of an optical transmitter in a PIC device which comprises a plurality of optical transmitters, a plurality of optical receivers, and an optical interconnect mesh which is structured to enable at least one of the following network architectures: a star network architecture; a bus/broadcast network architecture; and a ring network architecture, and comprises a reflecting optical element, and a bi-directional coupler comprising a plurality of ports on a first side which comprise ports that are operatively associated with the optical transmitters and ports that are operatively associated with the optical receivers, and at least one port on a second side which is operatively associated with the reflecting optical element, the method comprising:

assigning each of the plurality of optical transmitters an individual optical signal for optical functionality verification;

transmitting the optical signal which is individually assigned to the optical transmitter by the optical transmitter towards the reflecting optical element via a port on the first side and the at least one port on the second side, wherein the reflecting optical element reflects the individually assigned optical signal back to the at least one port on the second side, and the bi-directional coupler distributes the individually assigned optical signal received thereat from the reflecting optical element among all the optical receivers; and determining whether the individually assigned optical signal is correctly received at at least one of the plurality of optical receivers.

2. The method according to claim 1 and wherein the determining also comprises determining whether the individually assigned optical signal is received over a correct channel wavelength.

3. The method according to claim 1 and wherein the individually assigned optical signal comprises one of the following: a fixed optical signal; and an alterable optical signal.

4. The method according to claim 1 and wherein the individually assigned optical signal comprises a digitally coded optical signal.

5. A method for providing at least one of communication protection and communication restoration in a PIC device, the method comprising:

embedding, within the PIC device, an optical interconnect mesh which comprises a reflecting optical element, and a bi-directional coupler comprising a plurality of ports on a first side, and at least one port on a second side which is operatively associated with the reflecting optical element;

associating a set of optical transceivers with the plurality of ports on the first side;

enabling a network architecture which comprises at least one of the following network architectures: a star network architecture; a bus/broadcast network architecture; and a ring network architecture, and in which an optical transceiver in the set of optical transceivers can communicate with every other optical transceiver in the set of optical transceivers via the embedded optical interconnect mesh by transmitting, by an optical transmitter of the optical transceiver, optical signals towards the reflecting optical element via a port on the first side and the at least one port on the second side, and distributing optical signals reflected by the reflecting optical element back to the at least one port on the second side among all optical receivers of the set of optical transceivers;

determining a first sub-group of the set of optical transceivers as a sub-group of active optical transceivers for use in normal communication; and assigning, in response to a determination of the first sub-group, a second sub-group of the set of optical transceivers as a protecting sub-group of optical transceivers for providing at least one of communication protection and communication restoration for the first sub-group.

6. The method according to claim 5 and wherein said assigning comprises automatically assigning the second sub-group of the optical transceivers as the protecting sub-group of optical transceivers.

7. The method according to claim 5 and also comprising maintaining an identification of the first sub-group and an identification of the second sub-group at a control and management system.

8. An optical switching method for use with a PIC device, the method comprising:

embedding, within the PIC device, an optical interconnect mesh which comprises a reflecting optical element, and a bi-directional coupler comprising a plurality of ports on a first side, and at least one port on a second side which is operatively associated with the reflecting optical element;

associating a set of optical transceivers with the plurality of ports on the first side;

enabling a network architecture which comprises at least one of the following network architectures: a star network architecture; a bus/broadcast network architecture; and a ring network architecture, and in which an optical transceiver in the set of optical transceivers can communicate with every other optical transceiver in the set of optical transceivers via the embedded optical interconnect mesh by transmitting, by an optical transmitter of the optical transceiver, optical packets towards the reflecting optical element via a port on the first side and the at least one port on the second side, and distributing optical packets reflected by the reflecting optical element back to the at least one port on the second side among all optical receivers of the set of optical transceivers;

determining, from among the optical packets, a first group of optical packets that can be switched by a flow-switching technique (FST) and a second group of optical packets that cannot be switched by FST; and switching the first group of optical packets by using FST and the second group of optical packets by using packet switching.

9. The method according to claim 8 and wherein the first group of optical packets comprises at least one of the following: at least one optical burst that exceeds a packet-length threshold; and at least one optical packet that is combinable with other optical packets.

10. The method according to claim 9 and also comprising: pre-selecting the packet-length threshold.

* * * * *